(12) United States Patent
Shimozato

(10) Patent No.: US 7,483,234 B2
(45) Date of Patent: Jan. 27, 2009

(54) CONTROL DEVICE, CONTROL METHOD, AND STORAGE APPARATUS FOR CONTROLLING READ HEAD AND WRITE HEAD CLEARANCE BY THERMAL PROTRUSION

(75) Inventor: Toru Shimozato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/983,493

(22) Filed: Nov. 9, 2007

(65) Prior Publication Data

US 2008/0170321 A1 Jul. 17, 2008

(30) Foreign Application Priority Data

Jan. 15, 2007 (JP) ............................. 2007-005507

(51) Int. Cl.
*G11B 5/60* (2006.01)
(52) U.S. Cl. ...................................................... 360/75
(58) Field of Classification Search ................. None
See application file for complete search history.

(56) References Cited

U.S. PATENT DOCUMENTS

| 7,375,914 | B1 * | 5/2005 | Dieron et al. ................. 360/75 |
| 7,365,931 | B2 * | 4/2008 | Ikai et al. ..................... 360/75 |
| 7,385,777 | B2 * | 6/2008 | Satoh et al. .................. 360/75 |
| 7,423,829 | B2 * | 9/2008 | Bang et al. ................... 360/75 |
| 7,426,090 | B2 * | 9/2008 | Yamashita et al. ............ 360/75 |
| 2006/0139789 | A1 * | 6/2006 | Yang ............................ 360/75 |
| 2007/0230015 | A1 * | 10/2007 | Yamashita et al. ............ 360/75 |
| 2007/0230019 | A1 * | 10/2007 | Song et al. ................... 360/75 |
| 2007/0230034 | A1 * | 10/2007 | Kondo ......................... 360/75 |
| 2008/0043363 | A1 * | 2/2008 | Yamashita et al. ............ 360/75 |
| 2008/0068739 | A1 * | 3/2008 | Oyamada et al. ............. 360/75 |

FOREIGN PATENT DOCUMENTS

| JP | 2003-272335 | 9/2003 |
| JP | 2006-172561 | 6/2006 |

* cited by examiner

*Primary Examiner*—William J Klimowicz
*Assistant Examiner*—James L Habermehl
(74) *Attorney, Agent, or Firm*—Greer, Burns & Crain, Ltd.

(57) ABSTRACT

Upon correction, an amplitude measurement unit repeats a process of attaining a write heat state by a write clearance control unit and writing user data to a data region of a measurement track in the state in which a head is positioned to an arbitrary measurement track and then switching the state to a read heat state by a read clearance control unit so as to detect an amplitude of a read signal from a preamble unit in a servo region. A variance calculation unit calculates a variance from the plurality of amplitude measurement values measured by the amplitude measurement unit; and a contact determination unit repeats the measurement process by the amplitude measurement unit while sequentially increasing the base heater control value when the variance is less than a predetermined threshold value and determines contact between the head and the medium when the variance exceeds the threshold value. The write clearance calculation unit calculates the clearance upon write heat of the head from the increased amount of the base heater control value upon contact determination.

18 Claims, 17 Drawing Sheets

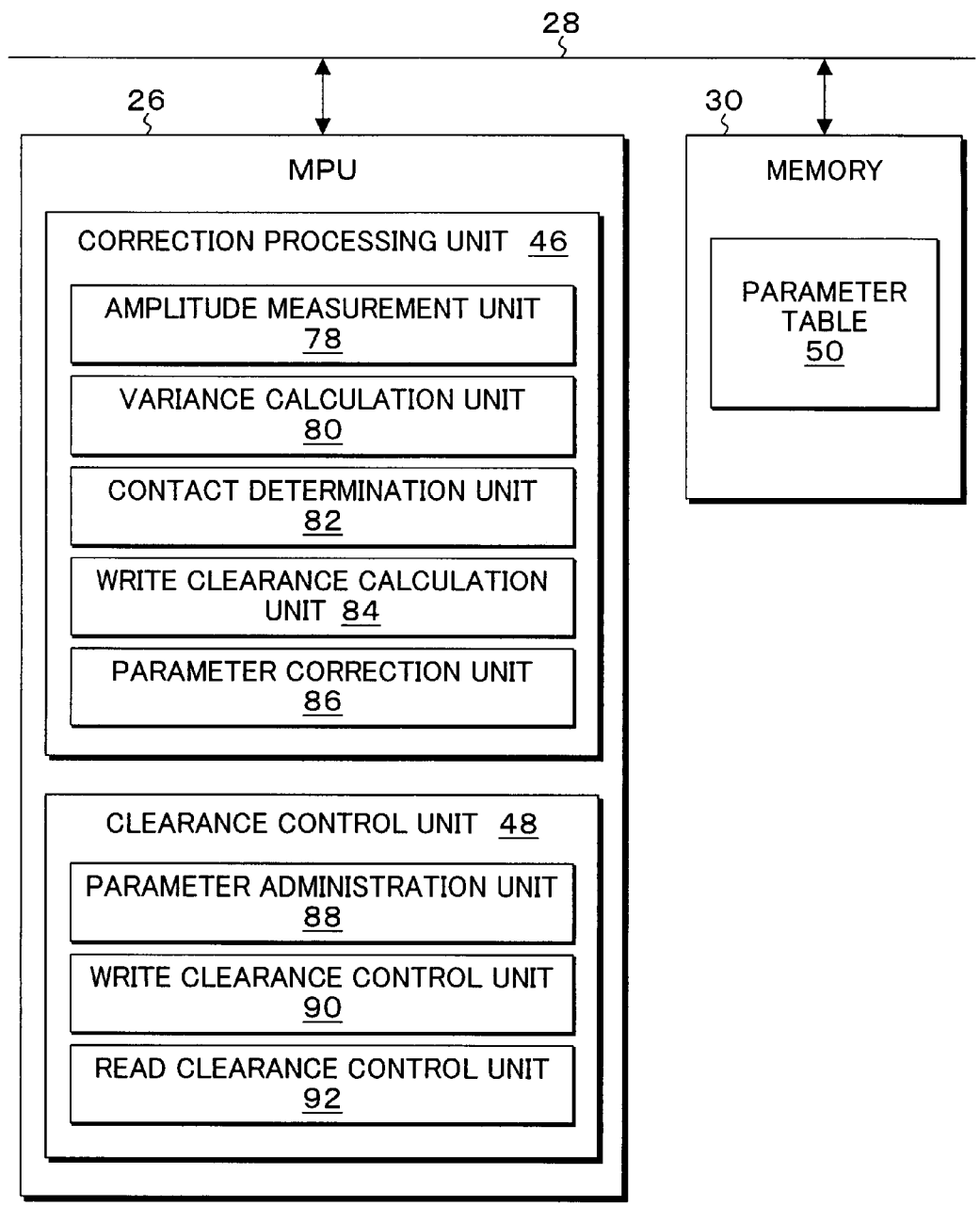

FIG. 4

| HEAD | ZONE | BASE HEATER CONTROL VALUE B | ADJUSTMENT HEATER CONTROL VALUE R |
|---|---|---|---|
| HH1 | Z1 | B11 | R11 |
| | Z2 | B12 | R12 |
| | Z3 | B13 | R13 |
| | Z4 | B14 | R14 |
| | ⋮ | ⋮ | ⋮ |
| | Zn | B1n | R1n |
| HH2 | Z1 | B21 | R21 |
| | Z2 | B22 | R22 |
| | Z3 | B23 | R23 |
| | Z4 | B24 | R24 |
| | ⋮ | ⋮ | ⋮ |
| | Zn | B2n | R2n |

50

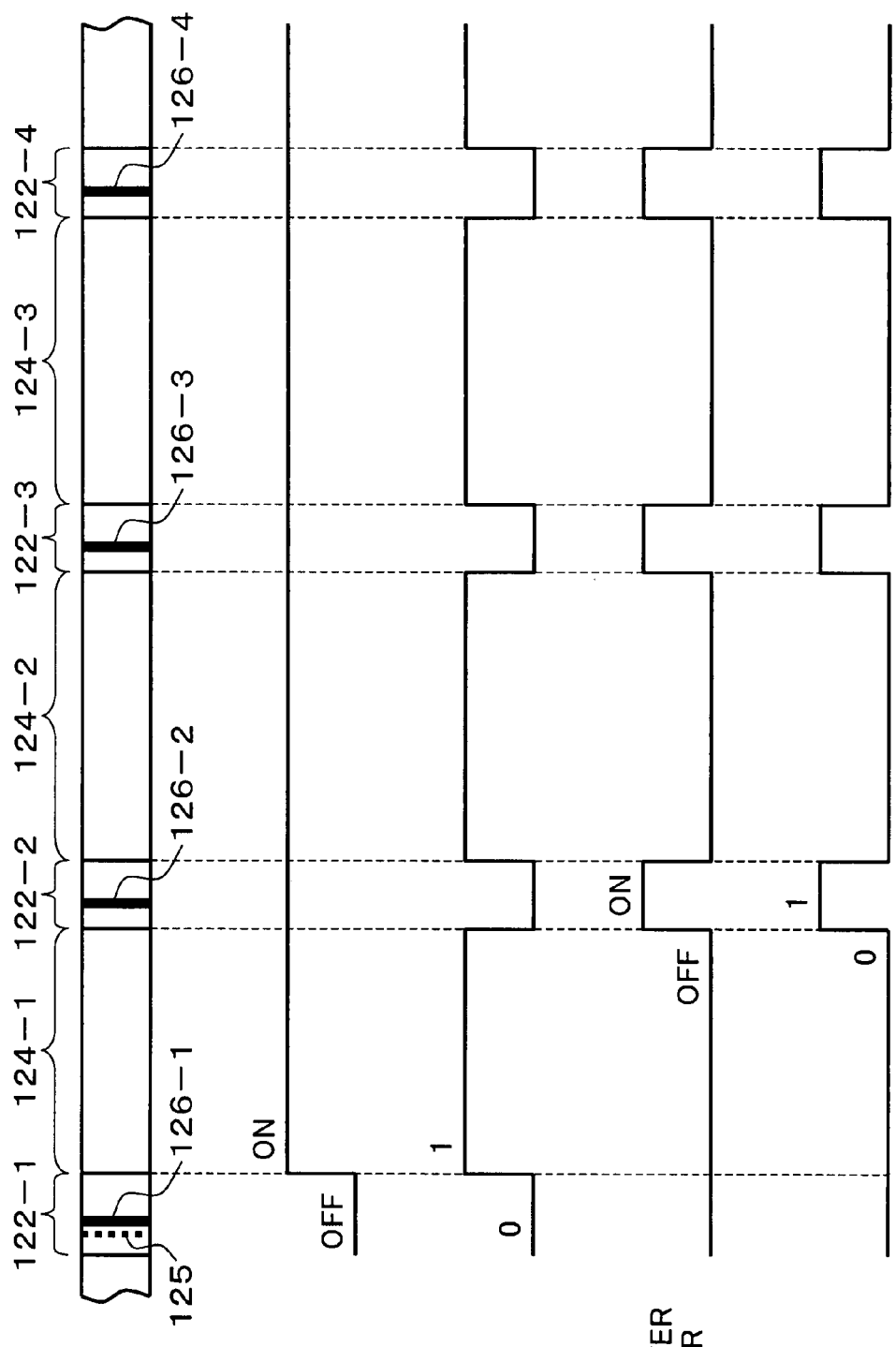

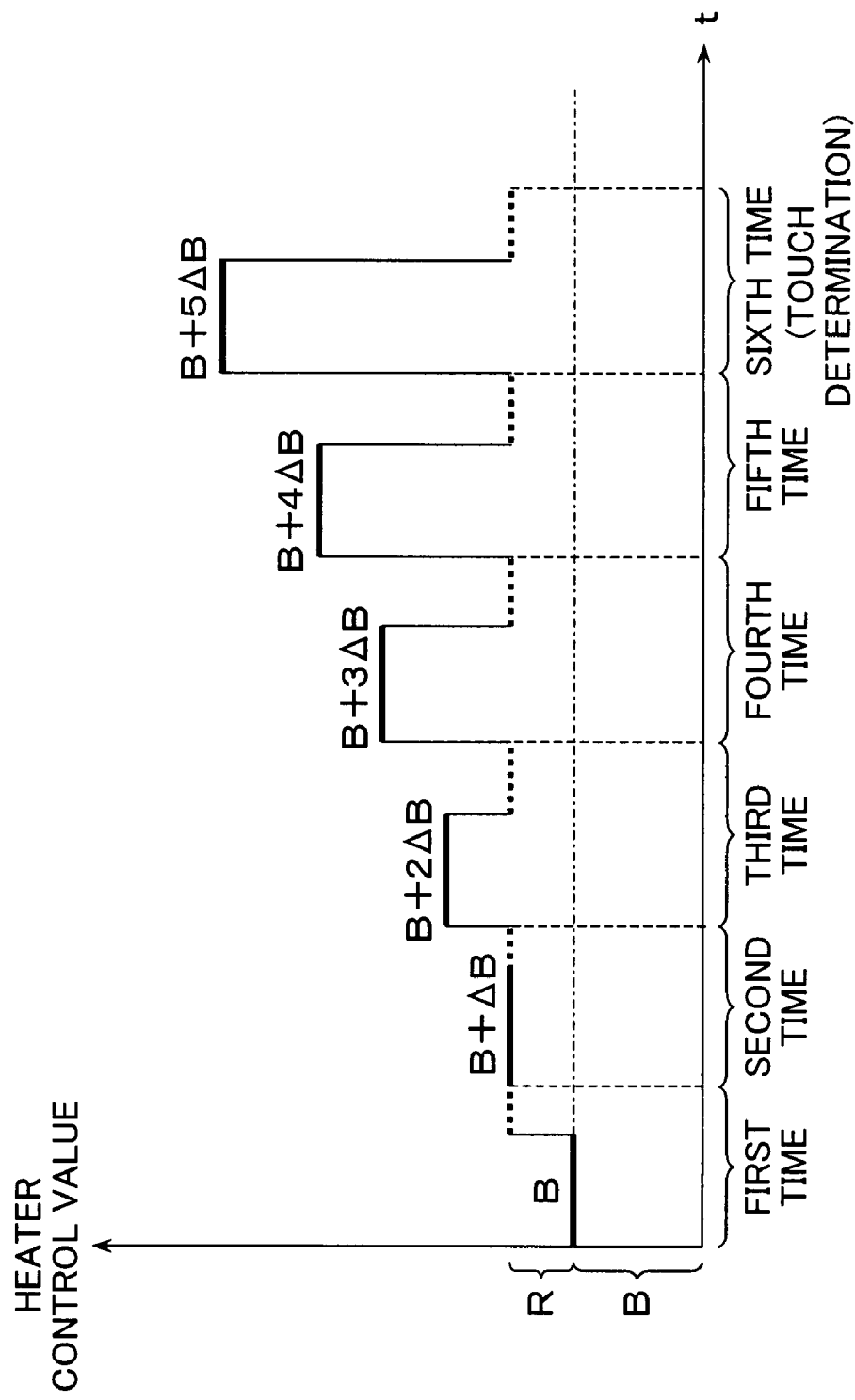

CONTROL DEVICE, CONTROL METHOD, AND STORAGE APPARATUS FOR CONTROLLING READ HEAD AND WRITE HEAD CLEARANCE BY THERMAL PROTRUSION

This application is a priority based on prior application No. JP 2007-005507, filed Jan. 15, 2007, in Japan.

BACKGROUND OF THE INVENTION

1. Field of the Invention

The present invention relates to a control device, a control method, and a storage apparatus for causing a head to fly above a rotating storage medium so as to read/write data and particularly relates to a control device, a control method, and a storage apparatus for controlling the clearance between a head and a storage medium surface to a predetermined target clearance by varying a protrusion value by thermal expansion that occurs along with power distribution to and heating of a heater provided in a head.

2. Description of the Related Arts

Conventionally, the clearance between a recording surface of a magnetic disk and a head has to be reduced in order to realize high recording density of a magnetic disk apparatus, and the clearance generated by flying of the head is designed to be constant by utilizing the pressure (positive pressure/negative pressure) of the air that flows into the space between a slider in which the magnetic head is disposed and the magnetic recording medium. In order to improve the recording density, the distance between the head and the medium has to be reduced. Therefore, the clearance of the head has been reduced year by year along with increase in the density of the recording density, and the clearance of 10 nm order has been realized recently. In a conventional head, since the clearance is maintained merely by the pressure of air, variation in the clearance generated among heads, for example, variation in the clearance due to the environmental temperature, mounting variation generated upon mounting of magnetic heads, and manufacturing variation generated among heads cannot be corrected. Therefore, the clearance has to be designed by the conditions that take the above described variations into consideration. However, since variations of the clearances are present among heads within common differences of mechanisms, there is a problem that the clearance cannot be set smaller than the range of common differences when medium contact is taken into consideration. Moreover, since a medium rotates at a high speed in a magnetic disk apparatus, collision with minute protrusions of the magnetic disk surface readily occurs when the clearance of the head is reduced; and, when the medium and the magnetic head are brought into contact with each other, there is a problem that the life of the apparatus cannot be satisfied due to wear of the head and contamination (dust) or the like that is generated when the head is brought into contact with the medium. Therefore, recently, as described in Patent Document 1, there has been proposed a method in which the variations in the protrusion value (TPR value) caused by the phenomenon in which the head flying surface protrudes in the direction toward the magnetic disk due to temperature increase of a write head (thermal protrusion: TPR) are measured in test processes or the like and retained on the magnetic disk, and the clearance is managed for each head by using the data. Furthermore, there have been also proposed methods like those of Patent Documents 2 and 3 in which a heater is built in a head, and the clearance between the head and the recording surface of a magnetic disk is controlled by utilizing the protrusion phenomenon that is caused by thermal expansion of the head flying surface along with power distribution to the heater. In Patent Document 2, a constant element temperature is maintained by varying the electric power, which is applied to an electrically conductive film provided in a head, with respect to the apparatus temperature or increase in the element temperature caused by recording/reproduction, thereby maintaining a constant clearance between the element and the recording medium. In Patent Document 3, a clearance-increasing heating device, which causes a part of an air bearing surface of a head to expand and protrude by heating so as to increase the distance between a recording/reproducing element and a magnetic disk surface, and a clearance-reducing heating device, which causes another part of the head air bearing surface to expand and protrude by heating so as to reduce the distance between the recording/reproducing element and the magnetic disk surface, are provided in the head, and the clearance is corrected so that reproduction can be performed without causing collision upon activation of the apparatus.

[Patent Document 1] Japanese Republished Kohyo Patent Publication No. 2002-037480

[Patent Document 2] Japanese Patent Application Laid-Open (kokai) No. 2005-071546

[Patent Document 3] Japanese Patent Application Laid-Open (kokai) No. 2005-276284

[Patent Document 4] Japanese Patent Application Laid-Open (kokai) No. 2003-273335

However, the above described methods, in which a heater is provided in a head to control the clearance between it and a magnetic disk recording surface, have a problem that the clearance upon recording cannot be measured even when the clearance upon reproduction can be measured although the clearance has to be measured both upon the reproduction performed by electric power distribution to the heater and the recording performed by electric power distribution to the heater, and the heater electric power that controls the clearance to an optimal target clearance upon reproduction and recording cannot be precisely determined. More specifically, in conventional clearance measurement upon reproduction, the relation that the smaller the clearance, the more the amplitude of a head read signal increases is utilized, thereby obtaining an optimal clearance by adjusting the amount of the heater electric power distribution, for example, so that the error upon reproduction has a predetermined value. Meanwhile, upon recording, in addition to expansion and protrusion of the head flying surface that is caused by electric power distribution to and heating of the heater, there is heat generating expansion that is caused when a recording current flows through a recording coil of the head; therefore, in the method in which the clearance is measured by performing reproduction and error detection after data is recorded, the clearance upon recording wherein the clearance is further reduced cannot be clarified, and precise clearance control by heater electric power distribution is difficult. In the clearance measurement that is based on error detection of a head read signal, there is a problem that the error detection accuracy obtained through recording/reproduction is dependent on the recording performance of a recording element and reproduction output power of a reading element, error detection sensitivity is different among heads, and precise clearance measurement is difficult to perform.

SUMMARY OF THE INVENTION

According to the present invention to provide a control device, a control method, and a storage apparatus capable of precisely measuring the clearance upon recording involving heater electric power distribution and controlling the clearance at high precision.

(Control Device)

The present invention provides a control device of a storage apparatus. The present invention is the control device of the storage apparatus having a head which is provided with a reading element and a recording element, is provided with a heater which varies a protrusion value by thermal expansion caused by electric power distribution and heating, and accesses data by flying over a rotating recording medium, the control device having a write clearance control unit which performs write heat upon recording by electric power distribution to the heater according to a predetermined base heater control value;

a read clearance control unit which performs read heat upon reproduction by electric power distribution to the heater according to a control value which is obtained by adding the predetermined base heater control value to an adjustment heater control value;

an amplitude measurement unit which repeats, upon desired correction, a process of attaining a write heat state by the write clearance control unit in the state in which the head is positioned to an arbitrary measurement track so as to perform recording in a data region of the measurement track, then switching the state to a read heat state by the read clearance control unit so as to reproduce a predetermined region of the measurement track, and detecting an amplitude of a read signal;

a variance calculation unit which calculates a variance from a plurality of amplitude measurement values measured by the amplitude measurement unit;

a contact determination unit which performs recording in a data region of the measurement track while sequentially increasing the base heater control value by the write clearance control unit when the variance is less than a threshold value, then performs reproduction of a predetermined region of the measurement track by switching the state to the read heat state by the read clearance control unit, repeats a measurement process by the amplitude measurement unit which detects the amplitude of the read signal, and determines that the head is in contact with the medium when the variance exceeds the threshold value; and a write clearance calculation unit which calculates a clearance of the head upon write heat from the increased amount of the base heater control value upon contact determination by the contact determination unit.

Herein, the variance calculation unit calculates the variance as $$\sigma^2 = \frac{\sum_{i=1}^{n} \{Ai - Aav\}^2}{n}$$ [Expression 2]

when the plurality of amplitude measurement values is Ai and a mean amplitude is Aav.

The variance calculation unit may calculate a standard deviation as a square root of the variance, and the contact determination unit may determine that the head is in contact with the recording medium when the standard deviation exceeds a predetermined threshold value.

The control device of the storage apparatus according to the present invention further has a parameter correction unit which corrects the base heater control value registered and administered in the parameter administration unit according to an error between the write clearance and a predetermined minimum clearance.

The Parameter Correction Unit performs correction by adding a heater correction value corresponding to a difference clearance, which is obtained by subtracting the minimum clearance from the measured write clearance, to the base heater control value when the measured write clearance is larger than the minimum clearance, and performs correction by subtracting the heater correction value corresponding to a difference clearance, which is obtained by subtracting the measured write clearance from the minimum clearance, from the base heater control value when the measured write clearance is smaller than the minimum clearance.

The control device of the storage apparatus according to the present invention may use the base heater control value as a base heater electric power value, and the adjustment heater control value as an adjustment heater electric power value.

(Method)

The present invention provides a control method of the storage apparatus. The present invention is the control method of the storage apparatus having a head which is provided with a reading element and a recording element, is provided with a heater which varies a protrusion value by thermal expansion caused by electric power distribution and heating, and accesses data by flying over a rotating recording medium, the control method including a write clearance control step of performing write heat upon recording by electric power distribution to the heater according to a predetermined base heater control value;

a read clearance control step of performing read heat upon reproduction by electric power distribution to the heater according to a control value which is obtained by adding the predetermined base heater control value to an adjustment heater control value;

an amplitude measurement step of repeating, upon desired correction, a process of attaining a write heat state in the write clearance control step in the state in which the head is positioned to an arbitrary measurement track so as to perform recording in a data region of the measurement track, then switching the state to a read heat state in the read clearance control step so as to reproduce a predetermined region of the measurement track, and detecting an amplitude of a read signal;

a variance calculation step of calculates a variance from a plurality of amplitude measurement values measured in the amplitude measurement step;

a contact determination step of performing recording in a data region of the measurement track while sequentially increasing the base heater control value in the write clearance control step when the variance is less than a threshold value, then performing reproduction of a predetermined region of the measurement track by switching the state to the read heat state in the read clearance control step, repeating a measurement process in the amplitude measurement step which detects the amplitude of the read signal, and determining that the head is in contact with the medium when the variance exceeds the threshold value; and a write clearance calculation step of calculating a clearance of the head upon write heat from the increased amount of the base heater control value upon contact determination by the contact determination unit.

(Storage Apparatus)

The present invention provides a storage apparatus. The present invention is the storage apparatus having a head which is provided with a reading element and a recording element, is provided with a heater which varies a protrusion value by thermal expansion caused by electric power distribution and heating, and accesses data by flying over a rotating recording medium, the control device having a write clearance control unit which performs write heat upon recording by electric power distribution to the heater according to a predetermined base heater control value;

a read clearance control unit which performs read heat upon reproduction by electric power distribution to the heater according to a control value which is obtained by adding the predetermined base heater control value to an adjustment heater control value;

an amplitude measurement unit which repeats, upon desired correction, a process of attaining a write heat state by the write clearance control unit in the state in which the head is positioned to an arbitrary measurement track so as to perform recording in a data region of the measurement track, then switching the state to a read heat state by the read clearance control unit so as to reproduce a predetermined region of the measurement track, and detecting an amplitude of a read signal;

a variance calculation unit which calculates a variance from a plurality of amplitude measurement values measured by the amplitude measurement unit;

a contact determination unit which performs recording in a data region of the measurement track while sequentially increasing the base heater control value by the write clearance control unit when the variance is less than a threshold value, then performs reproduction of a predetermined region of the measurement track by switching the state to the read heat state by the read clearance control unit, repeats a measurement process by the amplitude measurement unit which detects the amplitude of the read signal, and determines that the head is in contact with the medium when the variance exceeds the threshold value; and a write clearance calculation unit which calculates a clearance of the head upon write heat from the increased amount of the base heater control value upon contact determination by the contact determination unit.

According to the present invention, when the variance is less than a predetermined threshold value, a recording operation is performed while sequentially increasing write heat electric power, immediately after that, it is switched to a reproduction operation, and a process of performing amplitude measurement is repeated so as to detect contact between the head and the medium. In the contact between the head and the medium, a pumping phenomenon in which the head jumps due to collision with small protrusions when the contact with the medium is started occurs. Therefore, it is switched to the reproduction operation in the state in which the pumping phenomenon is generated. Detection is performed when the variation of the amplitude measurement values in that process or the variance of the measured values exceeds a threshold value, and the fact that the head is in contact with the medium is precisely determined. When contact between the medium of head and the medium can be precisely determined, the write clearance can be precisely calculated from the varied amount of the heater electric power up to the contact determination. Since the clearance upon recording, in which the head is subjected to write heat to write data, can be precisely measured in this manner, the clearance can be controlled to a minimum clearance for each head and recording position (zone) of the medium without impairing the flying margin upon recording/reproduction, thereby improving error rate. The above and other objects, features, and advantages of the present invention will become more apparent from the following detailed description with reference to the drawings.

BRIEF DESCRIPTION OF THE DRAWINGS

FIG. 3 is a block diagram showing details of a functional configuration of a MPU in the present embodiment;

FIG. 4 is an explanatory diagram of a parameter table used in the present embodiment.

FIGS. 11A to 11E are time charts showing a write clearance measurement process in the present embodiment;

FIG. 12 is an explanatory diagram showing increase variation of a base heater control value for contact determination in a write clearance measurement process of the present embodiment;

DETAILED DESCRIPTION OF THE PREFERRED EMBODIMENTS

Figure 1:
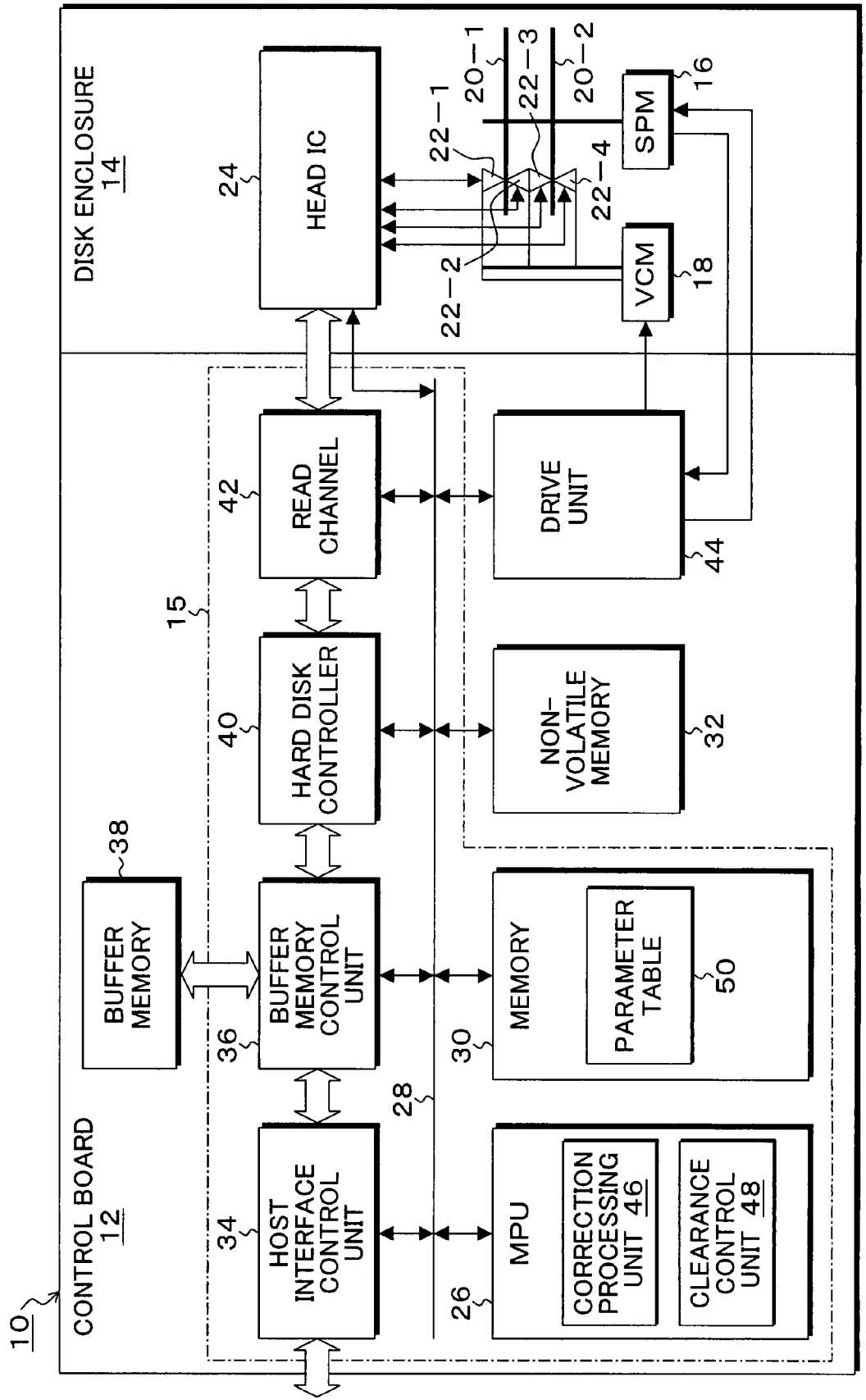
FIG. 1 is a block diagram of a magnetic disk apparatus showing an embodiment of a storage apparatus according to the present embodiment.

FIG. 1 is a block diagram showing an embodiment of a magnetic disk apparatus according to the present invention. In FIG. 1, the magnetic disk apparatus 10 which is known as a hard disk drive (HDD) is composed of a disk enclosure 14 and a control board 12. A spindle motor (SPM) 16 is provided in the disk enclosure 14; and magnetic disks (storage media) 20-1 and 20-2 are attached to a rotating shaft of the spindle motor 16 and rotated at, for example, 4200 rpm for a certain period of time. In addition, a voice coil motor (VCM) 18 is provided in the disk enclosure 14, wherein the voice coil motor 18 has distal ends of arms of head actuators on which heads 22-1 to 22-4 are loaded and performs positioning of the heads with respect to recording surfaces of the magnetic disks 20-1 and 20-2. In addition, recording elements and reading elements are loaded on the heads 22-1 to 22-4 in an integrated manner. The heads 22-1 to 22-4 are connected to a head IC 24 by signal lines, and the head IC 24 selects one of the heads according to a head select signal based on a write command or a read command from a host, which serves as an upper-level apparatus, so as to perform a write or a read. Moreover, in the head IC 24, a write amplifier is provided for a write system, and a pre-amplifier is provided for a read system. An MPU 26 is provided in the control board 12, and, with respect to a bus 28 of the MPU 26, a memory 30, which uses a RAM and stores a control program and control data, and a non-volatile memory 32, which uses an FROM or the like and stores a control program, are provided. In addition, with respect to the bus 28 of the MPU 26, a host interface control unit 34, a buffer memory control unit 36 which controls a buffer memory 38, a hard disk controller 40, a read channel 42 which functions as a write modulation unit and a read modulation unit, a drive unit 44 which controls the voice coil motor 18 and the spindle motor 16 are provided. Herein, the MPU 26, the memory 30, the host interface control unit 34, the buffer memory control unit 36, the hard disk controller 40, and the read channel 42 in the control board 12 can be composed as one control device 15; and, specifically, the control device 15 is composed as one LSI device. The magnetic disk apparatus 10 performs writing processes and reading processes based on commands from the host. Herein, normal operations in the magnetic disk apparatus will be described below. When a write command and write data from the host are received by the host interface control unit 34, the write command is decoded by the MPU 26, and the received write data is stored in the buffer memory 38 in accordance with needs. Then, it is converted into a predetermined data format by the hard disk controller 40, an ECC code is added thereto by ECC processing, and scrambling, RLL code conversion, and write compensation are performed in the write modulation system in the read channel 42. Then, it is written to a magnetic disk 20-1 from the write amplifier via the head IC 24 and from the recording element of, for example, the selected head 22-1. In this course, the MPU 26 gives a head positioning signal to the drive unit 44 having a VCM motor driver, etc.; and the voice coil motor 18 causes a head to seek a target track which is specified by the command and to be placed on the track so as to perform track following control. Meanwhile, when a read command from the host is received by the host interface control unit 34, the read command is decoded by the MPU 26, read signals read by the reading element of the head 22-1 which is selected by head selection of the head IC 24 are amplified by the pre-amplifier. Then, they are input to the read demodulation system of the read channel 42, read data is demodulated by partial response maximum likelihood detection (PRML) or the like, and errors are detected and corrected by performing ECC processing by the hard disk controller 40. Then, they are subjected to buffering to the buffer memory 38, and the read data is transferred to the host from the host interface control unit 34. As functions of the present embodiment realized in the MPU 26 by executing programs, a correction processing unit 46 and a clearance control unit 48 are provided. The heads 22-1 to 22-4 of the present embodiment have the reading elements and the recording elements and are provided with heaters which vary the protrusion value by thermal expansion involved in heating caused by electric power distribution. For example in an examination process in a plant, the correction processing unit 46 measures and adjusts, for each head and each zone of the magnetic disks, heater control values which are required for controlling the clearance between respective reading elements and the recording surfaces of the magnetic disks 20-1 to 20-2 for each of the heads 22-1 to 22-4, registers that in a parameter table 50, and records that to system areas of the magnetic disks 20-1, 20-2 or the non-volatile memory 32 of the apparatus. The heater control values used in the present embodiment include two values, a base heater control value B and an adjustment heater control value R, and the two heater control values B and R are determined for each head and each zone of the magnetic disks and registered in the parameter table 50 in a correction process. The heater control values at a normal temperature 30° C. in the apparatus are registered in the parameter table 50. Therefore, a temperature difference ΔT from the normal temperature is calculated by reading the temperature T in the apparatus upon recording/reproduction. Temperature correction is performed by adding a temperature correction value, which is obtained by multiplying a conversion coefficient to the heater control value per unit temperature, thereto. The clearance control unit 48 varies the electric power distributed to the heater provided in the head to vary the protrusion amount of the head, thereby controlling the clearance to a predetermined minimum clearance (target clearance) upon reproduction and recording.

Figure 2A:
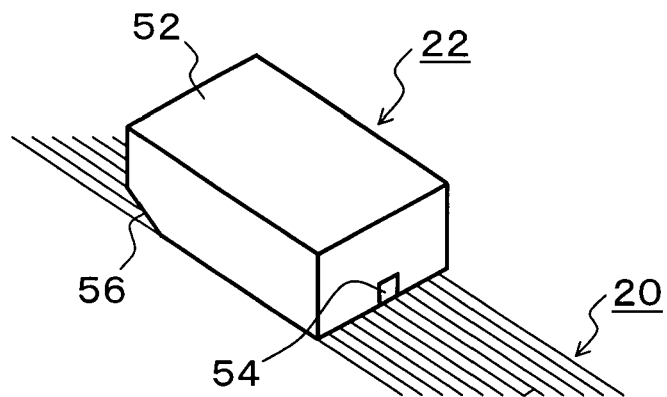
FIGS. 2A and 2B are explanatory diagrams of a head structure of the present embodiment.
Figure 2B:
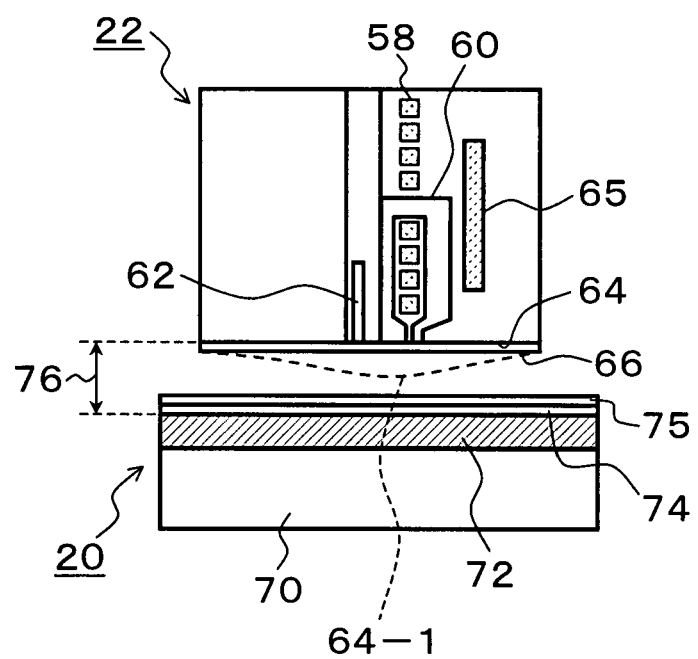

FIGS. 2A and 2B are explanatory drawings of a head structure of the present embodiment. FIG. 2A focuses on a head 22 which is used in the present embodiment, wherein a reading element and a recording element are formed on an end face of a slider 52 which is made of, for example, a ceramic material. A tapered surface 56 is formed in the distal end side of the flying surface of the slider 52 which is opposed to the magnetic disk 20, and an air communication groove 54 is formed on the flying surface in the track direction.

FIG. 2B is a cross sectional view wherein the head 22 is viewed from the track direction. A recording coil 58 and a recording core 60 are provided as the recording element in the head 22 which is made of ceramic or the like. A reading element 62 is provided in the left side of the recording element such that it is adjacent thereto. As the reading element 62, a GMR element (Giant Magneto Resistance element) or a TMR element (Tunneling Magneto Resistance element) is used. The surface of the head 22 opposed to the magnetic disk 20 is an ABS surface (Air Bearing Surface) 64, and a protective film 66 is formed on the surface thereof. On the other hand, in the magnetic disk 20, a recording film 72 is formed on a substrate 70, a protective film 74 is formed subsequent to the recording film 72, and a lubricant 75 is further provided on the surface. In the present embodiment, a heater 65 is provided such that it is close to the recording core 60 which constitutes the recording element of the head 22. When electric power is distributed to the heater 65 so as to carry out heating, the ABS surface 64 serving as the flying surface of the head 22 expands and protrudes toward the magnetic disk 20 side as shown by a broken-like head surface 64-1. A clearance 76 between the head 22 and the magnetic disk 20 is defined as a distance from the lower end of the reading element 62 to the recording film 72 of the magnetic disk 20.

FIG. 3 is a block diagram showing details of a functional configuration of the MPU 26 in the present embodiment. In FIG. 3, as functions of the MPU 26 realized by execution of a firmware program, the clearance control unit 48 and the correction processing unit 46 are provided. In the clearance control unit 48, a parameter administration unit 88, a write clearance control unit 90, and a read clearance control unit 92 are provided. The parameter administration unit 88 administers registration and reading of the heater control values with respect to the parameter table 50 which is read and located in the memory 30. In the parameter table 50, as shown in FIG. 4, the base heater control values B and the adjustment heater control values R are registered separately for heads and zones. The base heater control value B and the adjustment heater control value R registered in the parameter table 50 are control values which are set and adjusted in the correction process in the correction processing unit 46 of FIG. 3. Herein, the base heater control value B and the adjustment heater control value R used in heater control in the present embodiment will be described.

Figure 5:
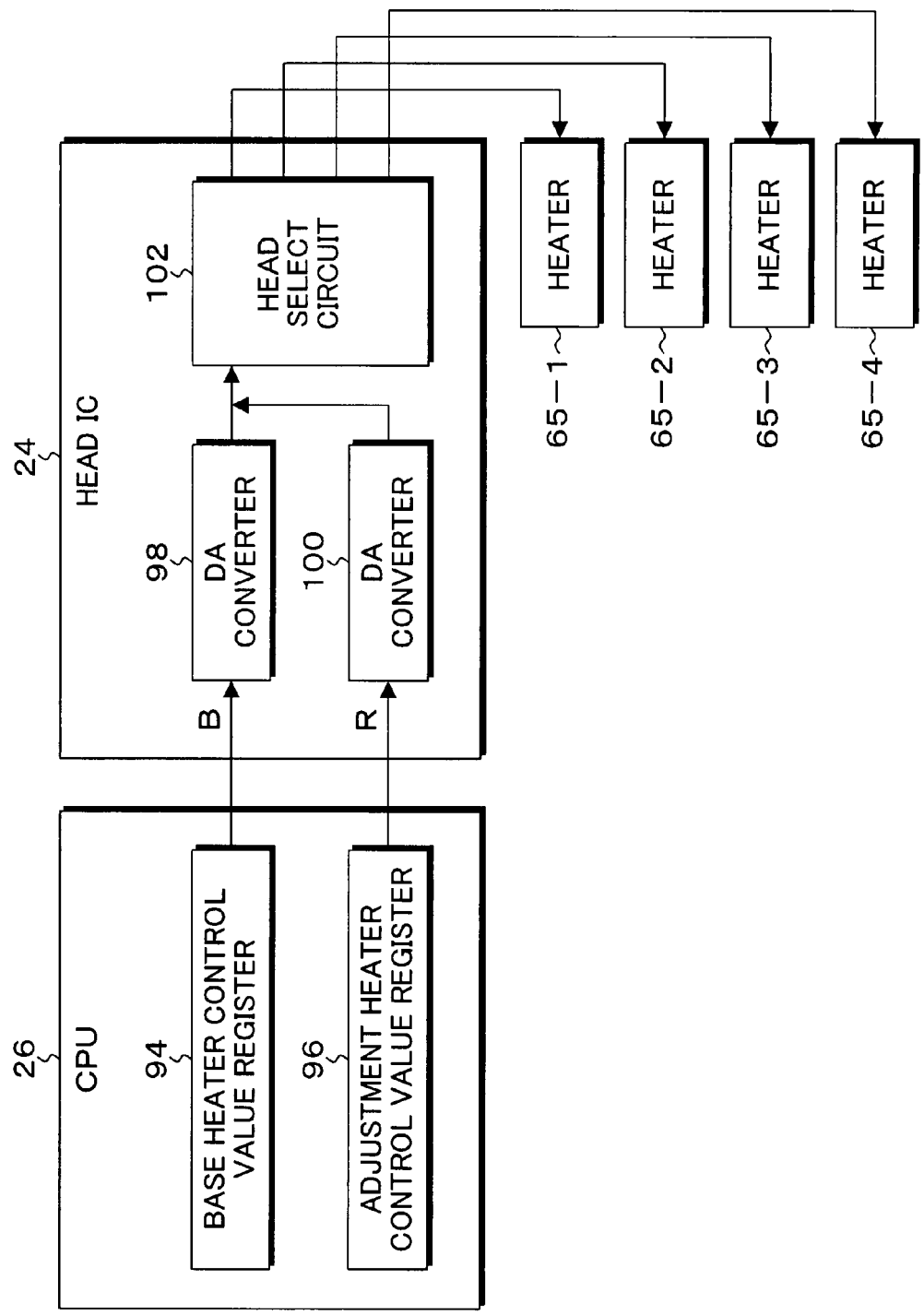
FIG. 5 is a block diagram of a heater control system in the present embodiment.

FIG. 5 is a block diagram of a heater control system in the present embodiment. In FIG. 5, in the MPU 26, a main heater control value register 94 and an adjustment heater control value register 96 are provided. Upon recording or reproduction, when a head and a zone are specified in the parameter table 50 shown in FIG. 4, the corresponding base heater control value B and adjustment heater control value R are read and set in the base heater control value register 94 and the adjustment heater control value register 96, respectively. DA converters 98 and 100 are provided in the head IC 24 side; wherein, after they respectively convert the heater control values B and R, which are set in the base heater control value register 94 and the adjustment heater control value register 96, into analog signals and add them, electric power is supplied via a head select circuit 102 to any of heaters 65-1 to 65-4 corresponding to the head which is selected at that point, the head is caused to protrude by heating and expansion, and the clearance which is a distance from the head surface to the medium surface is controlled to a minimum clearance (target clearance) d0 which is set in advance.

Figure 6:
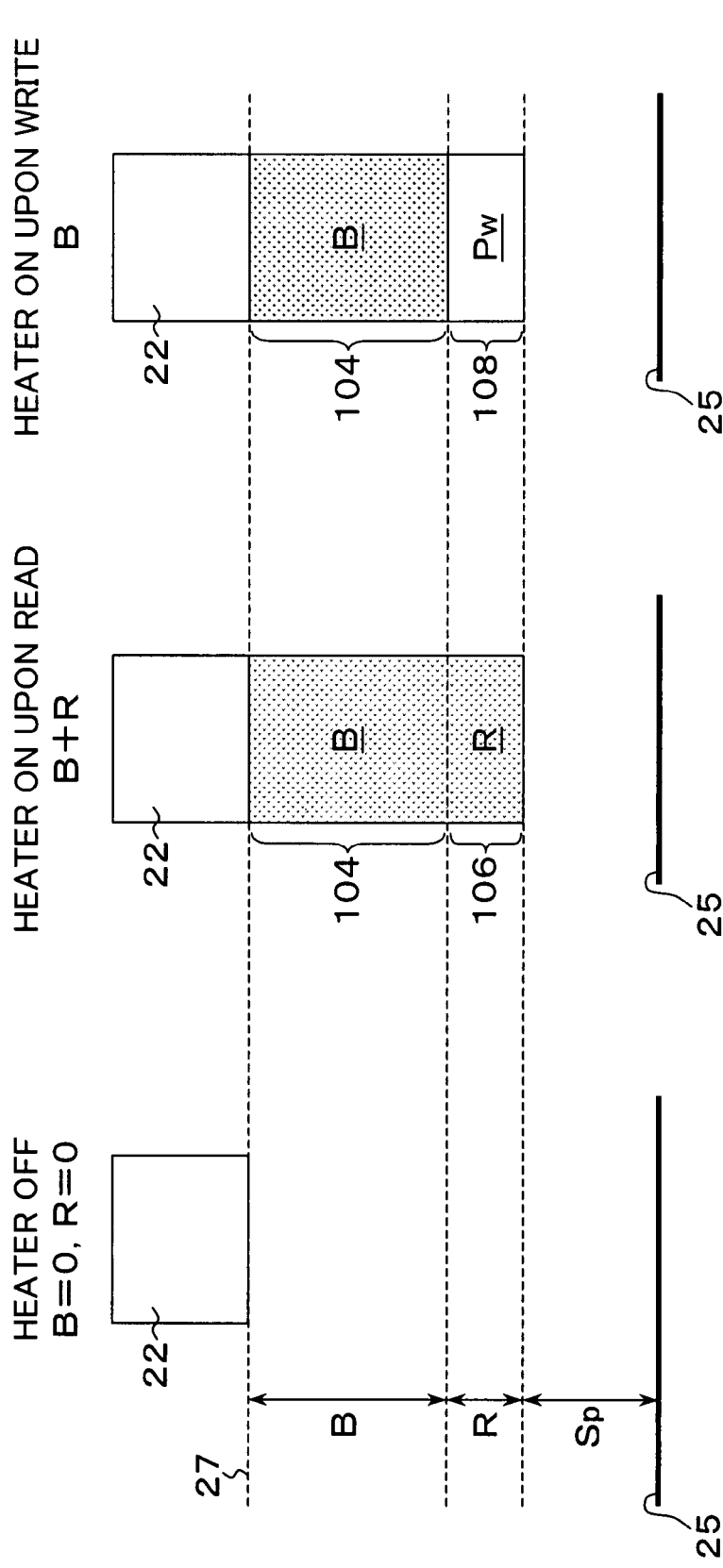
FIGS. 6A to 6C are explanatory diagrams of heater control upon reproduction and recording using base heater control values and adjustment heater control values in the present embodiment.

FIGS. 6A to 6C are explanatory diagrams of heater control upon read and write using the base heater control value B and the adjustment heater control value R in the present embodiment. FIG. 6A is in the state in which heater electric power distribution is turned off, wherein B=0 and R=0 at that point, and the head surface 27 of the head 22 is not protruded by thermal expansion.

FIG. 6B shows variation of the head surface upon read. Upon the read, electric power is distributed to the heater by a heater control value (B+R), which is obtained by adding the base heater control value B to the adjustment heater control value R, so as to heat and expand the head 22, thereby generating a head surface variation amount 104 by the base heater control value B and a head surface variation amount 106 by the adjustment heater control value R and reserving space corresponding to a minimum clearance heater control value Sp which is an equivalent value of the heater control value corresponding to a minimum clearance d0 between the head and a medium surface 25.

FIG. 6C shows variation of the head surface caused by the heater control value upon write; wherein, upon write, the adjustment heater control value R is turned off, and electric power is distributed to the heater merely by the base heater control value B, thereby generating the head surface variation amount 104 corresponding to the base heater control value B. Furthermore, upon write, heat generation is caused when a recording current is caused to flow through the recording coil 58 of the head 22 show in FIG. 2B, and a head surface variation amount 108 corresponding to the thermal expansion caused by write power Pw is added. Therefore, upon recording, the minimum clearance d0 is reserved with respect to the medium surface 25 by the head surface variation amount, which is obtained by adding the head surface variation amount 108 caused by the write current to the head surface variation amount 108 caused by the base heater control value B. Furthermore, both upon the read of FIG. 6B and the write of FIG. 6C, since there is delay until the protrusion value caused by thermal expansion is stabilized after electric power is distributed to the heater of the head 22, preheating is performed from a point that is before a target sector by a predetermined set number of sectors. The heater control value upon the preheating is the heater control value (B+R), which is obtained by adding the base heater control value B to the adjustment heater control value R, both upon the read and write. By virtue of the preheating corresponding to the predetermined set number of sectors, the heater control value upon read is the added heater control value (B+R) which is unchanged as shown in FIG. 6B when the head reaches the target sector upon read; therefore, the heater control value of the preheating is maintained as it is so as to start read processing. On the other hand, upon the write of FIG. 6C, since merely the base heater control value B is to be used, the value is switched to the target heater control value B from the heater control value (B+R) of the preheating when the head reaches the target sector so as to perform write processing. The read processing involving such heater control of FIG. 6B and the write processing involving the heater control of FIG. 6C is executed by the write clearance control unit 90 and the read clearance control unit 92, respectively, which are provided in the clearance control unit 48 of FIG. 3. In the write clearance control and the read clearance control, a write command and a read command received from the upper-level apparatus are decoded so as to reference the parameter table 50 of FIG. 4 according to the heads and zones corresponding to target tracks, the base heater control values B and the adjustment heater control value R corresponding to the heads and zones are acquired, and the heater control of read and the heater control of write shown in FIG. 6B or 6C is executed.

Figure 7:
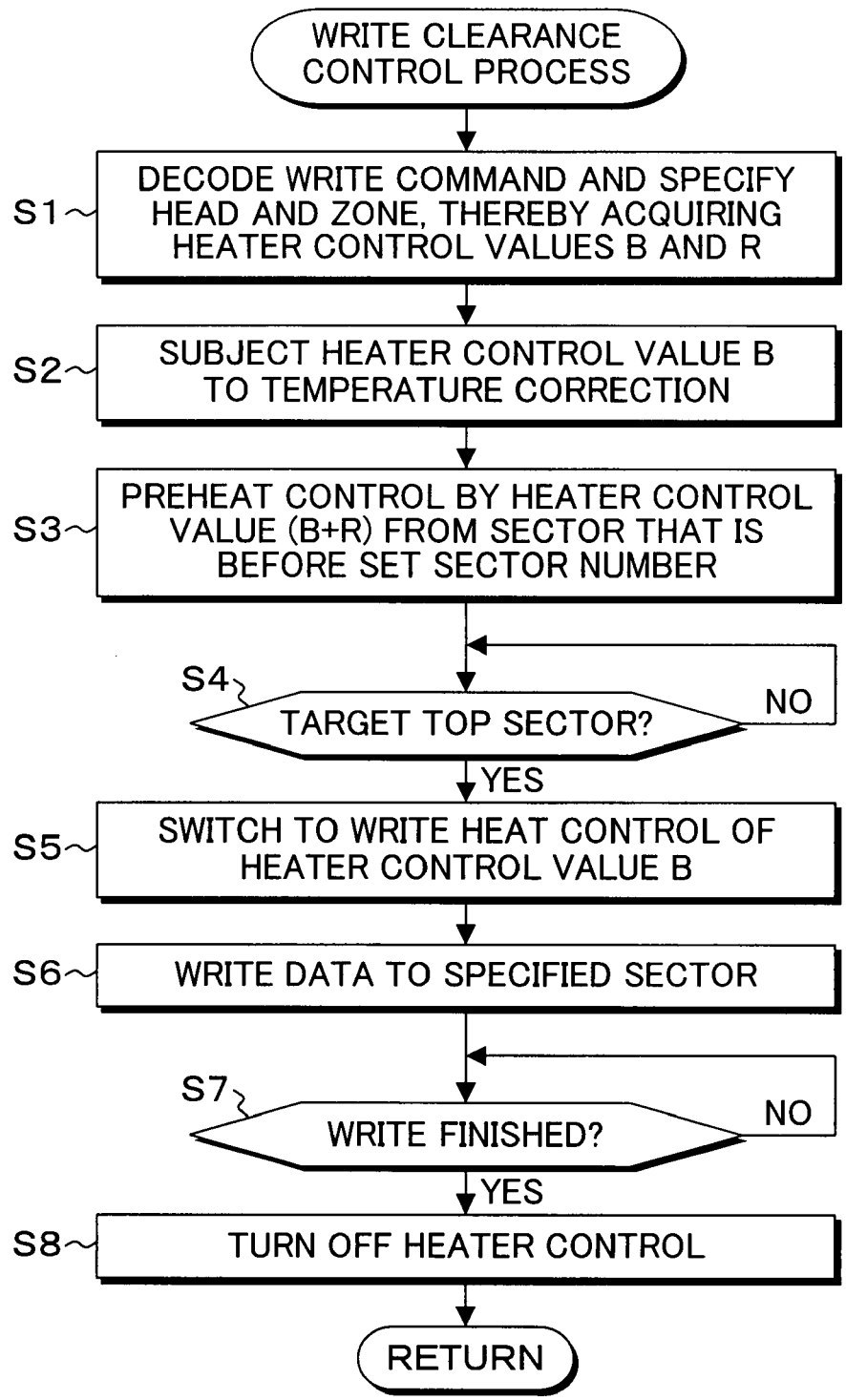
FIG. 7 is a flow chart showing a write clearance control process according to the present embodiment.

FIG. 7 is a flow chart showing a write clearance control process according to the present embodiment which is performed by the write clearance control unit 90 of FIG. 3. In FIG. 7, in the write clearance control process, first, in step S1, a write command is decoded, a target track is recognized, and the parameter table 50 of FIG. 4 is referenced by specifying a head and a zone, thereby obtaining the base heater control value B and the adjustment heater control value R. Subsequently, in step S2, the acquired base heater control value B is subjected to temperature correction. In this temperature correction, since the heater control values at 30° C. that is a normal temperature in the apparatus are registered in the parameter table 50 of FIG. 4, the current temperature T in the apparatus is read, and a temperature difference $\Delta T$ from the normal temperature is calculated as $$\Delta T = T - 30° C.; \text{ and,}$$

a temperature correction value Bt is obtained by multiplying it by a conversion coefficient to a heater control value per a unit temperature, and correction is performed so that $$B = B + Bt.$$

Herein, if the temperature in the apparatus is higher than 30° C., the temperature correction value Bt is a value below zero, and the base heater control value B is corrected to a value that is lower by the temperature correction value Bt. When the temperature in the apparatus is below 30° C., the temperature correction value Bt is a value above zero, and the base heater control value B is corrected to a value that is higher by the temperature correction value Bt. Next, in step S3, preheat control is performed by the heater control value (B+R) from a sector that is before a target sector by a set sector number. Subsequently, a target top sector is checked in step S4. When reach to the target top sector is determined, it is switched to write heat control of the heater control value B in step S5. Data is written to specified sectors in step S6. When write termination is determined in step S7, the heater control is turned off in step S8.

Figure 8:
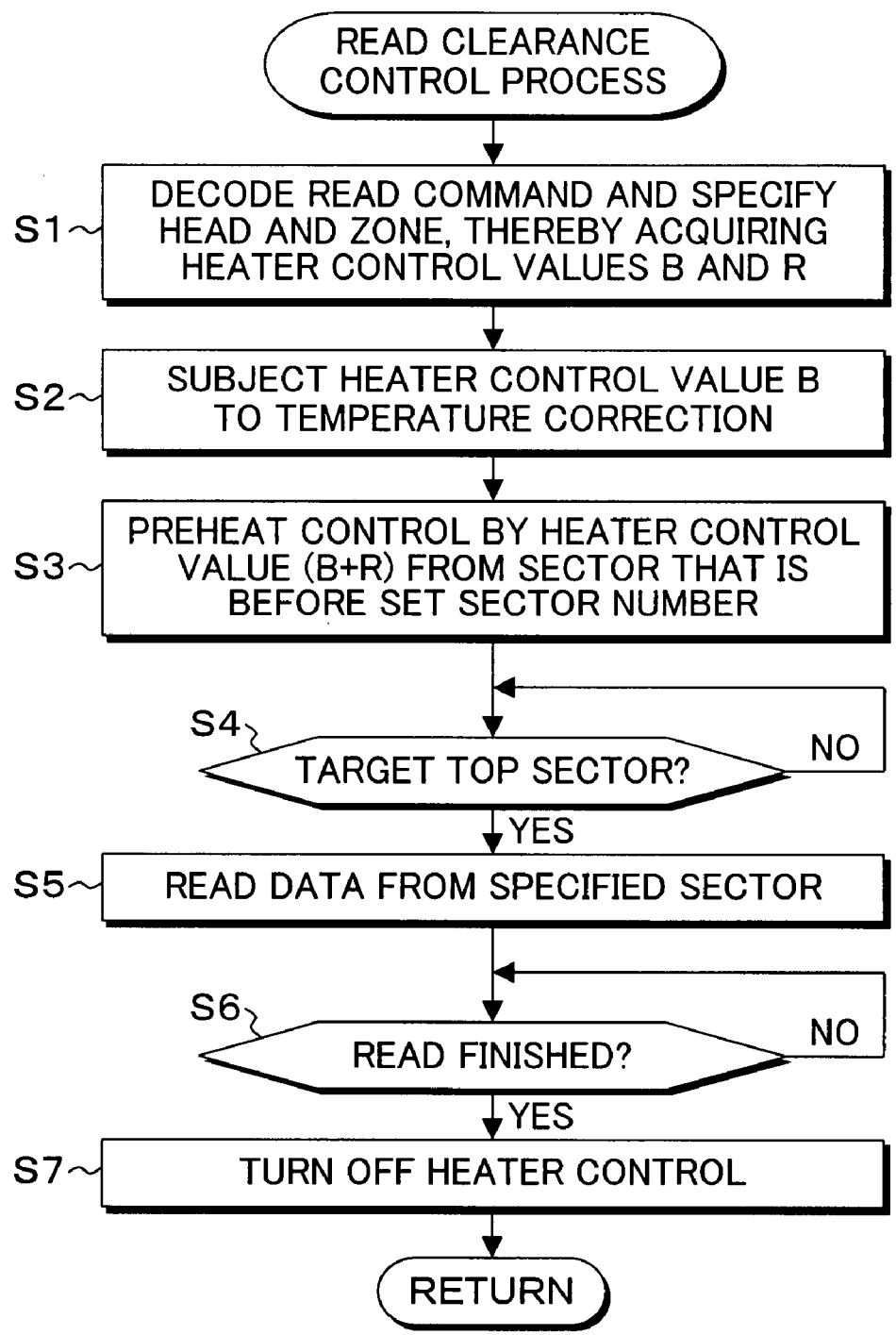
FIG. 8 is a flow chart showing a read clearance control process according to the present embodiment.

FIG. 8 is a flow chart showing a read clearance control process according to the present embodiment which is executed by the read clearance control unit 92 of FIG. 3. In FIG. 8, in the read clearance control process, first, in step S1, a read command is decoded, a target track is recognized, and the parameter table 50 of FIG. 4 is referenced by specifying a head and a zone, thereby obtaining the base heater control value B and the adjustment heater control value R. Subsequently, in step S2, the acquired base heater control value B is subjected to temperature correction. In the temperature correction, since the heater control values at 30° C. which is a normal temperature are registered in the parameter table 50 of FIG. 4, the current temperature T in the apparatus is read, and the temperature difference ΔT from the normal temperature is calculated as $$\Delta T = T - 30°\ C.;\ and$$

the temperature correction value Bt is obtained by multiplying it by a conversion coefficient to a heater control value per a unit temperature, and correction is performed so that $$B = B + Bt.$$

Subsequently, in step S3, preheat control is performed by the heater control value (B+R) from a sector that is before by the set sector number. Subsequently, when reach to a target top sector is determined in step S4, the process proceeds to step S5, in which read is started while the heater control value (B+R) is not changed but maintained. Then, when read termination is determined in step S6, the heater control value is turned off in step S7. Referring again to FIG. 3, the correction processing unit 46 provided in MPU 26 is a function realized by executing firmware for correction processing which is installed in the MPU 26 in a test process or the like in a manufacturing stage of the apparatus. In the correction processing unit 46, an amplitude measurement unit 78, a variance calculation unit 80, a contact determination unit 82, a write clearance calculation unit 84, and a parameter correction unit 86 are provided. Upon correction, in the state in which the head is positioned to an arbitrary measurement track on the magnetic disk, the amplitude measurement unit 78 repeats a process of writing user data to a data region of the measurement track in the state in which write heat is performed by the write clearance control unit 90, then switching the state to a read heat state by the read clearance control unit 92, and detecting an amplitude Ai of a read signal from a preamble unit in a servo region. Herein, i is an integer representing the number of measurement of 1 to n. The variance calculation unit 80 calculates a variance $\sigma^2$ by the below expression from a plurality of amplitude measurement values Ai measured by the amplitude measurement unit 78.

[Expression 3]

$$\sigma^2 = \frac{\sum_{i=1}^{n} \{Ai - Aav\}^2}{n} \quad (1)$$

Note that, although the variance is calculated by the expression (1) in the present embodiment, instead of the variance, a standard deviation σ may be calculated as a square root of the variance, and the contact determination unit 82 may determine contact between the head and the magnetic disk when the standard deviation σ exceeds a predetermined threshold value. The contact determination unit 82 repeats the measurement process by the amplitude measurement unit 78 while sequentially increasing the base heater control value B by a predetermined value ΔB each time when the variance is less than a predetermined threshold value and determines that the head is in contact with the magnetic disk when the variance exceeds the threshold value. The write clearance measurement unit 84 obtains the increasing amount of the base heater control value B upon contact determination performed by the contact determination unit 82 as (m×ΔB) from the number m of times of measurement until the contact determination and calculates the write clearance d upon write heat of the head from the increasing amount (m×ΔB).

The write clearance d can be calculated as $$d = (m \times \Delta B) \times e\ [nm] \quad (2)$$

since the clearance e [nm/bit] per 1 bit of the base heater control value B given as digital data is known in advance. The parameter correction unit 86 corrects the base heater control value B of the parameter table 50, which is registered and administered by the parameter administration unit 88, by an error Δd between the measured write clearance d and the predetermined minimum clearance do (conversion value of minimum clearance heater control value Sp).

Figure 9:
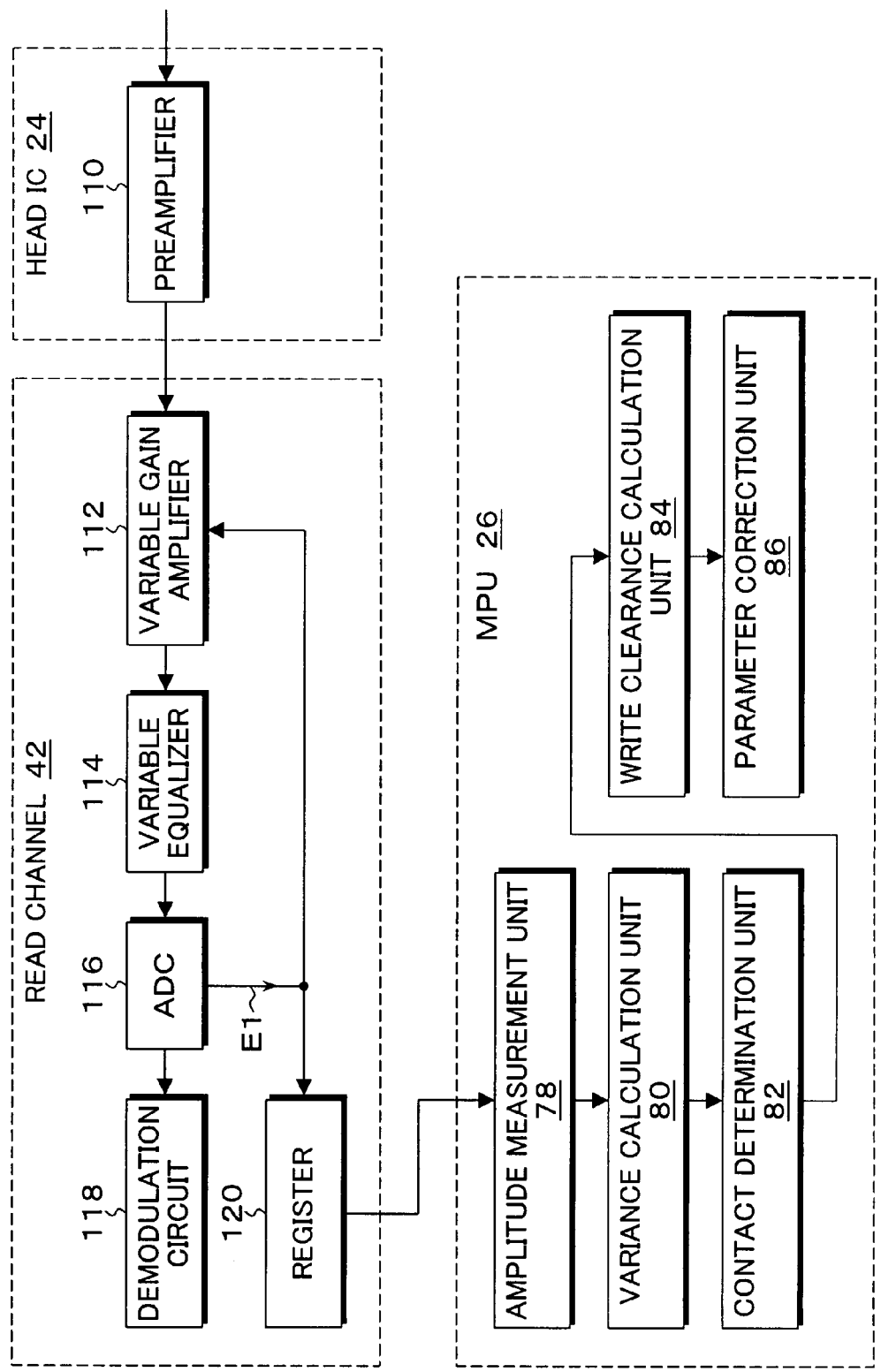
FIG. 9 is a block diagram showing a functional configuration of a correction process according to the present embodiment together with a circuit unit which detects the amplitude of a preamble read signal.

FIG. 9 is a block diagram showing a functional configuration for write clearance measurement by the correction processing unit 46 of the present embodiment together with a circuit unit which detects the amplitude of the preamble read signal. In FIG. 9, the correction processing unit 46 is provided in the MPU 26 as shown in FIG. 3. In the correction processing unit 46, the amplitude measurement unit 78, the variance calculation unit 80, the contact determination unit 82, the write clearance calculation unit 84, and the parameter correction unit 86 are provided, and measurement process of the write clearance is performed by these.

Figure 10A:
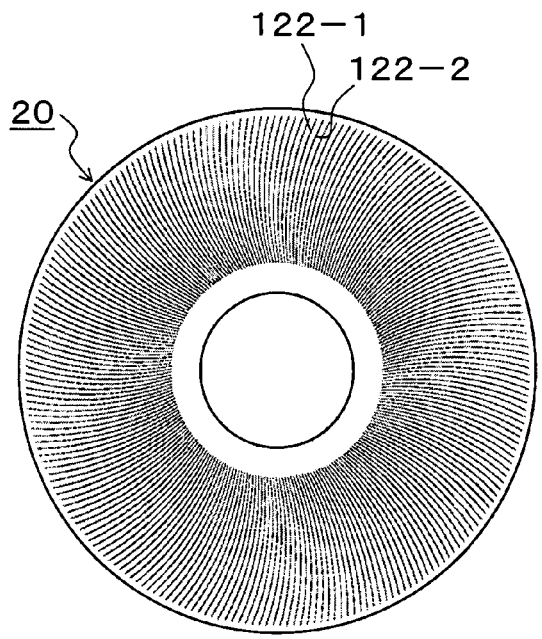
FIGS. 10A and 10B are explanatory diagrams of servo frames and measurement tracks of a magnetic disk.

FIG. 10A focuses on the magnetic disk 20 used in the present embodiment, wherein servo regions 122-1, 122-2 . . . are stored in advance at a constant angle interval on the recording surface of the magnetic disk 20, and the regions therebetween are data regions.

Figure 10B:
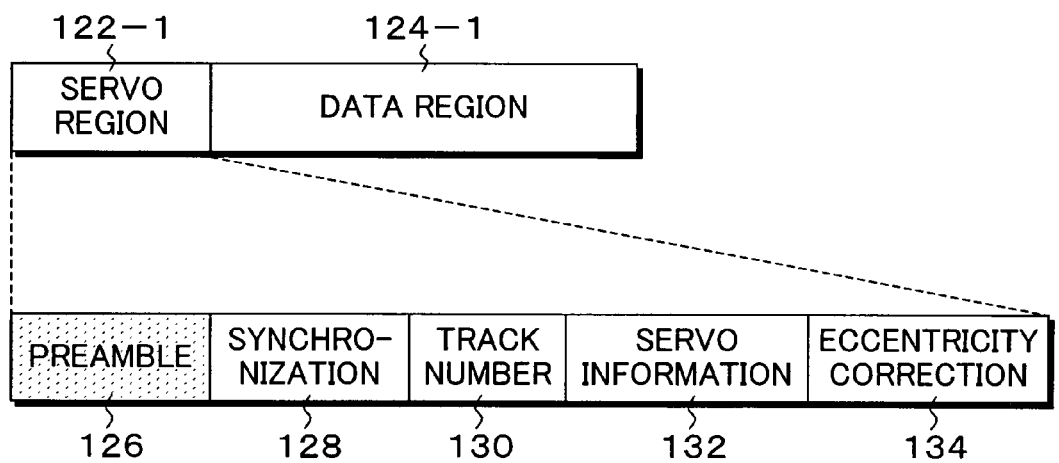

FIG. 10B focuses on one frame of a measurement track of the magnetic disk 20, wherein the frame is illustrated by straight lines in order to simplify the explanation thereof. One frame is composed of the servo region 122-1 and the data region 124-1. As shown in the lower side in an enlarged manner, the servo region 122-1 is composed of a preamble region 126, a synchronization region 128, a track number region 130, a servo information region 132, and an eccentricity correction region 134. Among these, in the preamble region 126, a repeated pattern of a predetermined frequency lower than a reference frequency of the user data is stored, and the preamble pattern is read and the amplitude thereof is measured in the present embodiment. Therefore, since the preamble is utilized, a special measurement track is not required to be provided, and the format efficiency is not affected. Note that a special measurement track may be provided, and a region for amplitude measurement may be provided in the measurement track. For example, when the data regions and the regions for amplitude measurement are alternately provided, immediately after a recording operation wherein a pumping phenomenon is generated, it can be switched to a reproduction operation, and the variation of the amplitude measurement values can be detected. Among the plurality of servo regions in FIGS. 10A and 10B, an index region is provided in one particular servo region, and a rotation reference value can be detected by reading an index signal of the index region. Amplitude measurement of the preamble read signal is performed by using the circuit unit of FIG. 9. The circuit unit of FIG. 9 focuses on the read channel 42 and the head IC 24 in the magnetic disk apparatus 10 of FIG. 1. In the head IC 24, a pre-amplifier 110 which amplifies a read signal obtained from a reading device is provided; and the output signal from the pre-amplifier 110 is amplified by a variable gain amplifier VGA 112 of the read channel 42, then equalized by a variable equalizer 114, and subjected to sampling in an AD converter 116 so as to be converted into digital data. Demodulation of the data and servo information is performed in a demodulation circuit 118. Herein, an AGC control signal (automatic gain control signal) E1 which maintains the amplifier output amplitude is supplied to the variable gain amplifier 112 from the AD converter 116. In the present embodiment, the AGC signal E1 for the variable gain amplifier 112 is retained in a register 120. Based on that, the MPU 26 acquires, as an amplitude measurement value, the amplitude of the head read signal from the AGC signal of the register 120, that is, the amplitude of the preamble read signal obtained as the head read signal. In amplitude measurement of the read signal in this case, when the gain according to the AGC signal E1 is G, the input/output of the variable gain amplifier VGA 112 is in the relation that (constant output amplitude)=(gain G)×(input amplitude);

therefore, it can be obtained as (input amplitude)=(constant output amplitude)/(gain G).

FIGS. 11A to 11E are time charts showing processes by the amplitude measurement unit 78 of FIG. 9. FIG. 11A shows a measurement track shown by straight lines, wherein the data regions 124-1, 124-2, 124-3, 124-4, . . . are disposed between the servo regions 122-1, 122-2, 122-3, 122-4, . . . , and the number n of the servo regions is, for example, n=174. In the servo frame 122-1, an index 125 is written. When the index 125 is detected, the rotation reference position of the magnetic disk, in other words, the top servo region 122-1 can be known. The servo regions 122-1, 122-2, 122-3, 122-4 . . . include preambles 126-1, 126-3, 126-4, . . . in the manner extracted and shown for the frame region 122-1 of FIG. 10B. In the amplitude measurement process of the present embodiment, as shown in FIG. 11B, detection of the index 125 of the servo region 122-1 serves as a starting position, write heat of distributing electric power to and heating the heater is performed by turning on the base heater control value B from the starting position of the data region 124-1 for the period corresponding to one track and subjecting the base heater control value B to AD conversion. At the same time, as shown in FIG. 1C, a write command of user data corresponding to one track is issued, a write gate WG is caused to rise from bit 0 to bit 1 so as to be effective at the timing of the data regions 124-1, 124-2, 124-3, . . . , and user data is written to each of the data regions 124-1, 124-2, 124-3, . . . in the write heat state. As shown in FIG. 1D, heater electric power distribution using the adjustment heater control value R is turned on respectively at the timing of the servo regions 122-2, 122-3, 122-4, . . . subsequent to the data regions 124-1, 124-2, 124-3, . . . in the measurement track. Since the base heater control value B of FIG. 11B is already turned on at this point, heating of the heater using the current that is obtained by subjecting the heater control value (B+R) to AD conversion, that is, read heat is performed. Then, as shown in FIG. 11E, at the timing of the servo regions 122-2, 122-3, 122-4, . . . , a read gate RG rises from bit 0 to bit 1 so as to be effective, thereby measuring the amplitudes of the preamble units 126-2, 126-3, 126-4 . . . which are present in the servo regions 122-2, 122-3, 122-4, . . . at this timing. Specifically, the AGC control signal (automatic gain control signal) E1 that retains a constant amplifier output amplitude output from the AD converter 116 to the variable gain amplifier 112 shown in the circuit unit of FIG. 9 is retained in the register 120; therefore, the amplitude measurement value indicating the amplitude of the preamble read signal is acquired from the AG control signal of the register 120. The write of user data to the data regions involving write heat control and the amplitude measurement of the preambles from the servo region involving the read heat control with respect to the measurement track of FIGS. 11A to 11E is executed in the unit of one track. When n amplitude measurement values A1 to An are obtained through one time of amplitude measurement of the measurement track, the variance $\sigma^2$ is calculated in accordance with the above described expression (1) by the variance calculation unit 80 of FIG. 9. When it is smaller than a predetermined threshold value in the contact determination unit 82, the base heater control value B is increased by a predetermined value $\Delta B$, and the same amplitude measurement process with respect to the measurement track is repeated.

FIG. 12 shows variation in the base heater control value B which is sequentially increased at each track upon amplitude measurement in the present embodiment. In FIG. 12, in a first measurement process, user data is written to the data regions wherein the write heat state is achieved by using the base heater control value B obtained from the parameter table 50. In the first read heat, as shown by a dotted line, in the read heat state caused by the heater control value (B+R) obtained by adding the adjustment heater control value R to the base heater control value B, the amplitude is measured based on the read signal of the preamble units in the servo regions. When the variance of the measurement amplitude does not exceed the threshold value in the first measurement process, in a second measurement process, user data is written to the data regions in the write heat state wherein (B+$\Delta B$) obtained by increasing the base heater control value B by the predetermined value $\Delta B$ is used. Meanwhile, regarding the read heat for obtaining the read signal of the preambles of the servo regions, it is fixed to the heater control value (R+B) which is same as that of the first time. When the variance is smaller than the threshold value in the second measurement, the base heater control value is sequentially increased by $\Delta B$ similarly in a third time, fourth time, and fifth time. When the base heater control value B used in write heat is sequentially increased by $\Delta B$ in this manner, the clearance between the head and the magnetic disk is sequentially reduced by thermal expansion of the head caused by the write heat, and the head is brought into contact with the magnetic disk when it is increased to a certain value.

In FIG. 12, for example when it is increased to a sixth base heater control value (B+5$\Delta B$), the fact that the head is brought into contact with the magnetic disk is determined when the variance calculated from the amplitude measurement values exceeds the threshold value.

Figure 13:
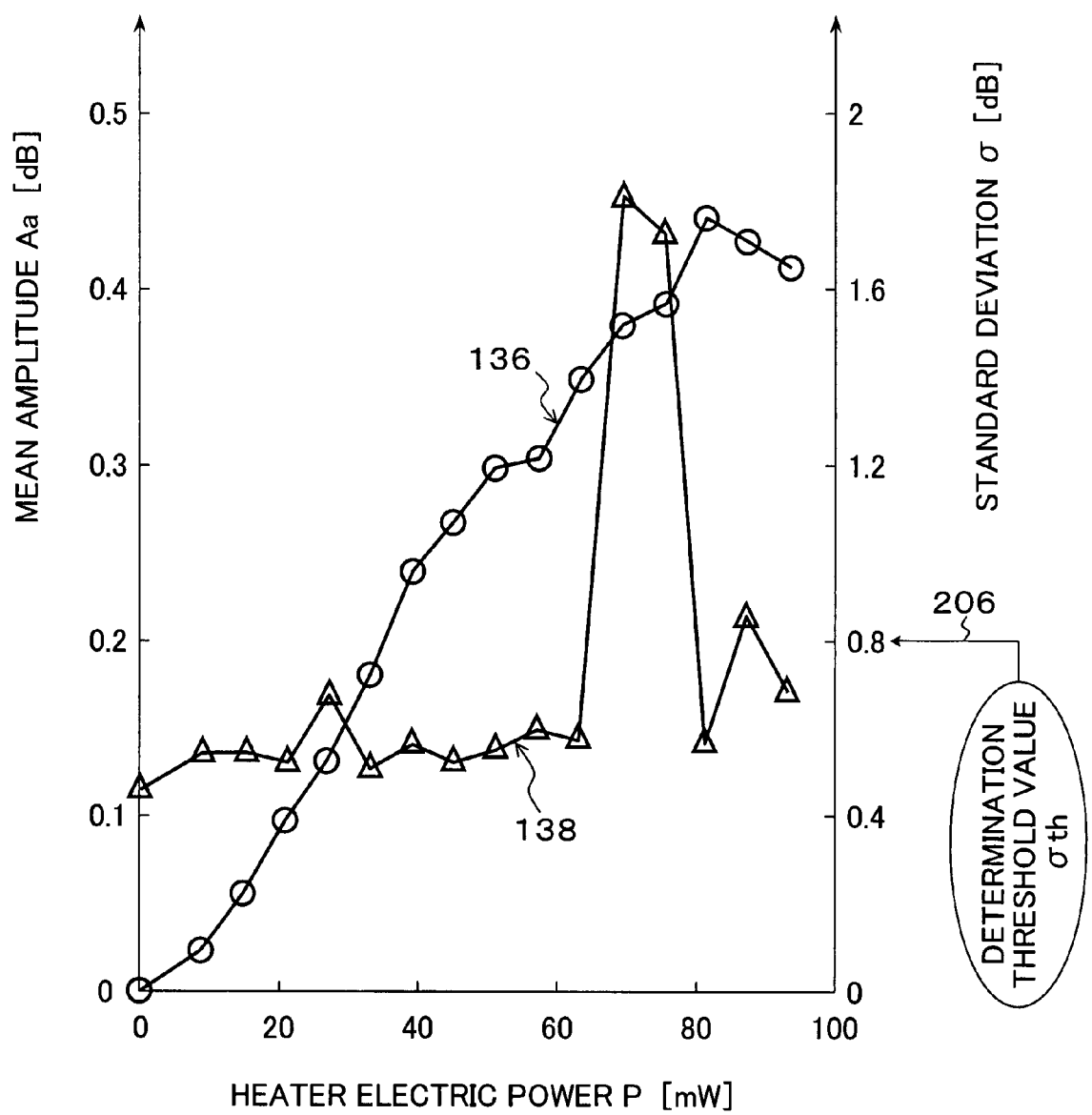
FIG. 13 is a graph chart showing measurement results of the mean amplitude and standard deviation with respect to increase heater electric power in the present embodiment.

FIG. 13 is a graph of actual measurement results showing the relation between a mean amplitude Aa and the standard deviation $\sigma$ which is a square root of the variance in the present embodiment. In FIG. 13, a measurement curve 136 of the mean amplitude Aa is increased as the clearance is reduced corresponding to increase of the heater electric power P caused along with increase in the base heater control value B by the predetermined value $\Delta B$. On the other hand, a measurement curve 138 of the standard deviation $\sigma$, it is smaller than $\sigma$th which is set as a determination threshold value until the heater electric power P is increased to 65 mW. However, when it exceeds 65 mW, the standard deviation $\sigma$ rapidly increases to 1.6 or more, maintains this state slightly before 80 mW, and then shows variation that it returns to a value equal to or less than the determination threshold value σth. Such rapid increase in the standard deviation σ when the heater electric power P is increased is caused by the fact that the head is heated and expanded along with increase of the heater electric power so as to reduce the clearance, and the pumping phenomenon in which the expanded head in the state immediately before contact with the magnetic disk jumps up due to contact with minute irregularities on the disk surface is generated. Due to the pumping phenomenon that occurs immediately after the head is brought into contact with the magnetic disk, the n amplitude measurement values obtained for the measurement track are largely varied, and this can be captured as the rapid increase in the standard deviation σ. Then, when the heater electric power is further increased, the head is brought into complete contact with the magnetic disk due to thermal expansion and does no longer jumps; therefore, the standard deviation σ is stabilized to equal to or less than the determination threshold value σth. In the present embodiment, as shown in the time chart of FIGS. 11A to 11E, the user data is written in the write heat state by the base heater control value B which is increased by ΔB at the timing of the data regions 124-1, 124-2, 124-3, . . . , the state is switched to the read heat state at the timing of the servo regions 122-2, 122-3, 122-4, . . . which are immediately after them, respectively, and the amplitude measurement values are measured from the red signals of the preambles 126-2, 126-3, 126-4, . . . therein; wherein the measurement is not performed upon recording. However, when the head is in the state immediately before contact with the magnetic disk due to heating by the base heater control value B, the pumping phenomenon, in which the head is brought into contact with minute irregularities on the magnetic disk in the data regions and jumps, is generated, and the influence of the jumping due to the pumping phenomenon continues even in the servo region immediately after that. Therefore, although the amplitude measurement is based on the read signal of the preambles by the read heat, the amplitude measurement results to which the jumping phenomenon caused by contact between the head and the magnetic disk caused by the write heat in the servo regions immediately before that is reflected can be obtained, and the contact between the head and the magnetic disk can be precisely determined, for example, by the increase in the standard deviation σ shown in FIG. 13. Note that, in the actual measurement results of FIG. 13, the heater electric power P is increased even after the standard deviation σ exceeds the determination threshold value σth; however, in practice, at the point when it exceeds the determination threshold value σth, further increase of the heater electric power is stopped so that unnecessary contact between the head and the magnetic disk is not performed.

Figure 14:
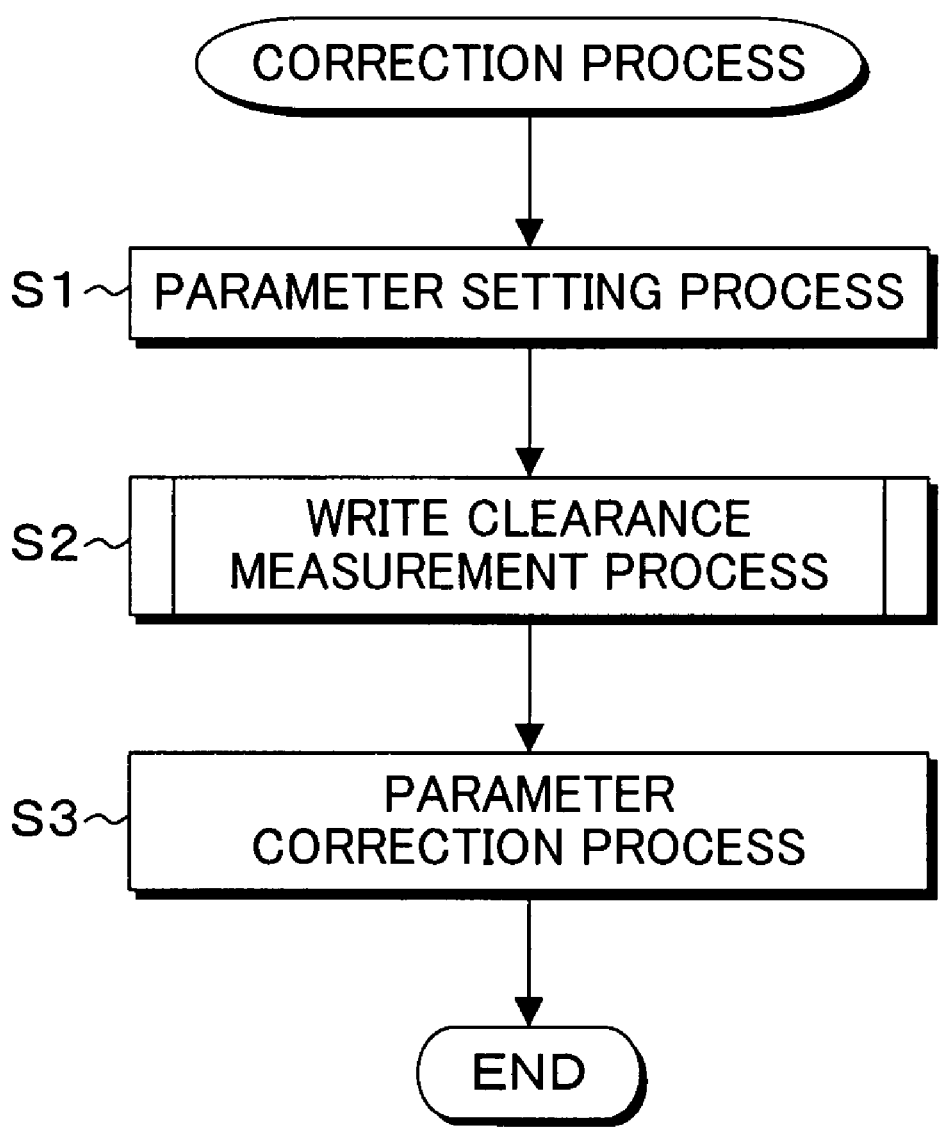
FIG. 14 is a flow chart of a correction process in the present embodiment.

FIG. 14 is a flow chart showing a correction process by the correction processing unit 46 of FIG. 3. In FIG. 14, the correction process is executed in a test process or the like in a manufacturing stage; wherein, in step S1, the base heater control values B and the adjustment heater control values R are set for the heads and zones with respect to the parameter table 50 shown in FIG. 4. In the parameter setting which is performed at the beginning with respect to the parameter table 50, the default values of the base heater control values B and the adjustment heater control values R prepared in a designing stage and an experiment stage are stored without change in all zones which are sorted in the units of the heads Subsequently, the process proceeds to step S2, wherein the write clearance measurement process is executed respectively for the heads and zones n the parameter table 50, thereby measuring the write clearance d. Subsequently, in step S3, a heater correction value Ba is obtained from the measured write clearance, and the values of the parameter table 50 set as the default values are corrected to the optimal base heater control values B corresponding to the actual measurement results.

Figure 15A:
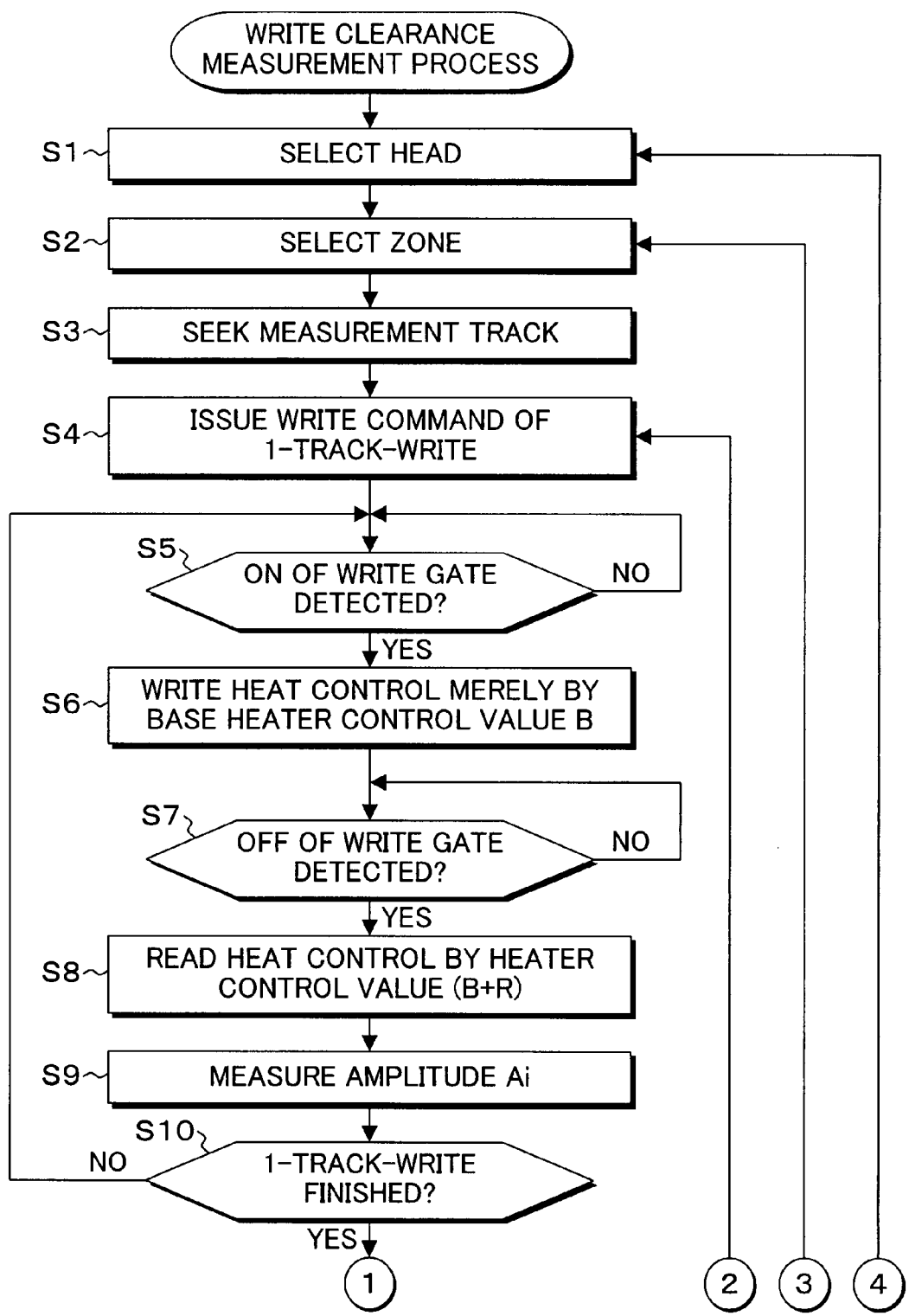
FIGS. 15A and 15B are flow charts showing a write clearance measurement process in the present embodiment.
Figure 15B:
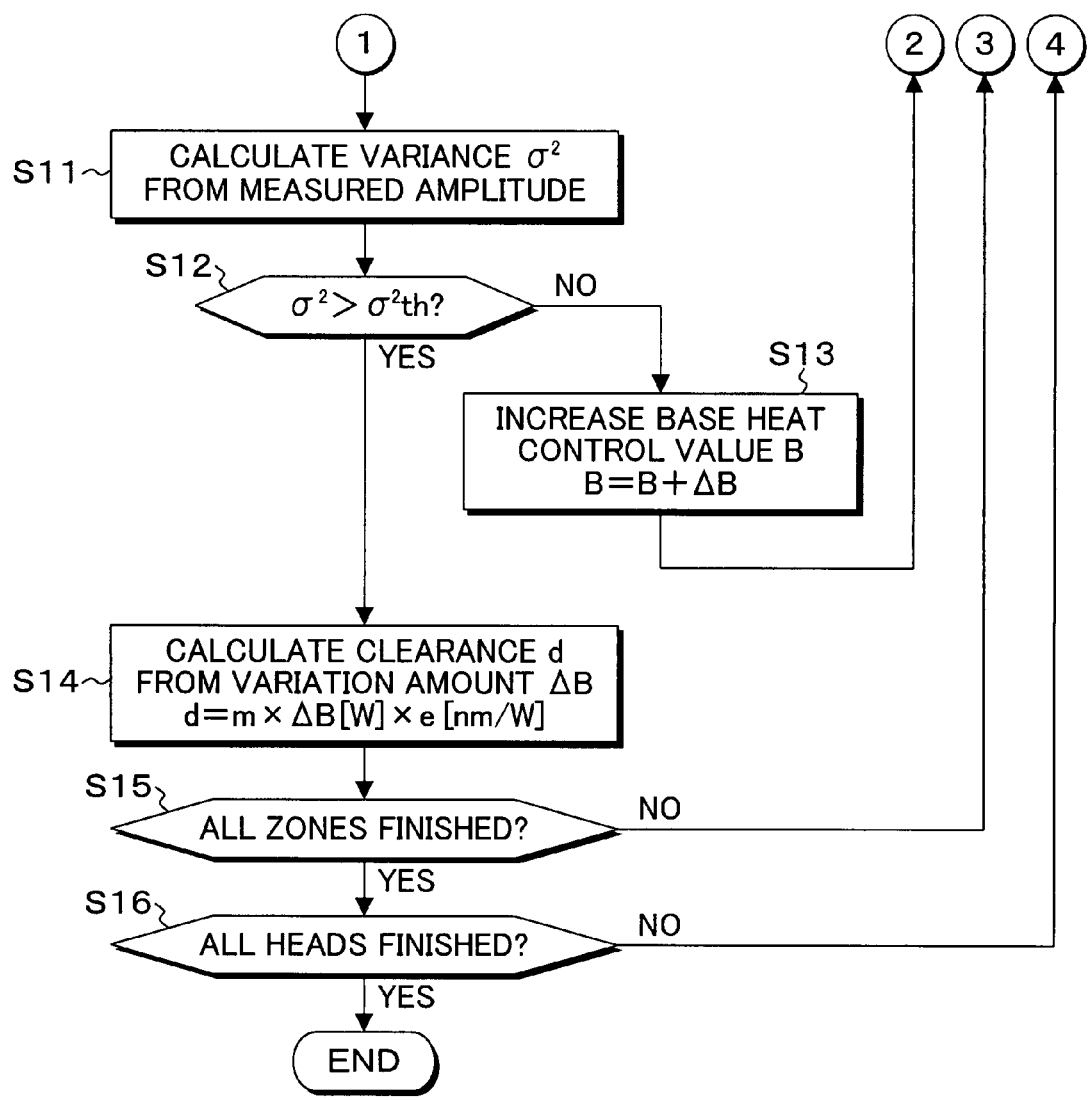

FIGS. 15A and 15B are flow charts of a write clearance measurement process in the present embodiment, and it will be as the following when described with reference to FIG. 9. In FIGS. 15A and 15B, in the write clearance measurement process, a head is selected in step S1, and subsequently a zone on the medium surface of the magnetic disk corresponding to the selected head is selected in step S2. The present embodiment employs the case, as an example, in which all the zones of the magnetic disk are selected for all the heads so as to execute the write clearance measurement process. Next, in step S3, a measurement track of the selected zone which is determined in advance is sought and the head is placed on the track. Then, in step S4, the base heater control value B and the adjustment heater control value R which are written in the parameter table 50 in advance before correction are used as command parameters, thereby issuing a write command of one track write. When the write command of the one track write is issued, the hard disk controller 40 shown in FIG. 1 outputs the write gate WG of FIG. 11C and the read gate RG of FIG. 11E. Subsequently, in step S5, whether turn-on of the write gate, in other words, rise to bit 1 is detected or not is checked. When it is detected that the write gate is turned on, the process proceeds to step S6, in which the write heat control merely by the base heater control value B is performed, thereby writing user data to the data regions based on the write command of one track write. Subsequently, when detection of turn-off of the write gate is determined in step S7, the process proceeds to step S8, in which the heater control value is switched to the heater control value (B+R) obtained by adding the adjustment heater control value R to the base heater control value B so as to perform read heat control. In step S9, the amplitude Ai obtained from the read signal of the preambles in the servo regions in the read head state is measured. As a matter of course, the amplitude Ai is the value obtained by retaining the gain control signal E1 in the register 120 for stabilizing the amplifier output from the AD converter 116 to the variable gain amplifier 112 shown in FIG. 9. Subsequently, the process proceeds to step S10, in which whether one track write is finished or not is checked. When it is unfinished, the process returns to step S5, wherein the process of write of user data to a next data region using write heat and, subsequent to that, amplitude measurement according to the read signal of the preambles of servo regions is repeated in steps S5 to S9. When termination of one track write is determined in step S10, n measurement amplitudes A1 to An are obtained at this point. Therefore, the process proceeds to step S11, in which the variance $\sigma^2$ is calculated from the measurement amplitudes according to the above described expression (1), and it is compared with the predetermined threshold value $\sigma^2$th in step S12. When the calculated variance $\sigma^2$ is smaller than the threshold value $\sigma^2$th, the process proceeds to step S13, in which the base heater control value B is increased by ΔB so that $$B=B+\Delta B.$$

The process again returns to step S4, in which a write command of one track write is issued for the same measurement track by using the increased base heater control value B and the fixed adjustment heater control value R, which is obtained as default, as control parameters. The processes of steps S5 to S10 are repeated as well as the first time. When the one track write is finished, the variance $\sigma^2$ is calculated in step S11. It is compared with the threshold value $\sigma^2$th in step S12. When it is smaller, the base heater control value B is further increased by ΔB again in step S13, and the processes from step S4 are repeated. As a result of such calculation of the variance based on the amplitude measurement of each measurement track, the base heater control value B is sequentially increased to expand the head, and the clearance between the head and the magnetic disk is reduced; and, when it is increased to a certain value, the expanded head starts contact with the magnetic disk. The pumping phenomenon occurs due to jumping that is caused along with start of the contact of the head, the variance $\sigma^2$ calculated in step S11 is rapidly increased, and it is determined that it exceeds the threshold value $\sigma^2$th in step S12. When the variance $\sigma^2$ exceeds the threshold value $\sigma^2$th, the process proceeds to step S14, in which the write clearance d is calculated from the variation amount (m×ΔB) wherein the number of increase of the base heater control value B is m. More specifically, the write clearance d is calculated as $$d = (m \times \Delta B) \times e \text{ [nm]}$$

since the clearance variation amount e [nm/bit] per one bit of the base heater control value B is known. Subsequently, whether all zones are finished or not is checked in step S15. If unfinished, the process returns to step S2, in which a next zone is selected, and the processes from step S3 are repeated. When termination of all the zones is determined in step S15, the process proceeds to step S16, in which whether all the heads are finished or not is checked. If unfinished, the process returns to step S1, in which a next head is selected, and the processes from step S2 are repeated. When all the heads are finished in step S16, the series of write clearance measurement process is finished.

Figure 16A:
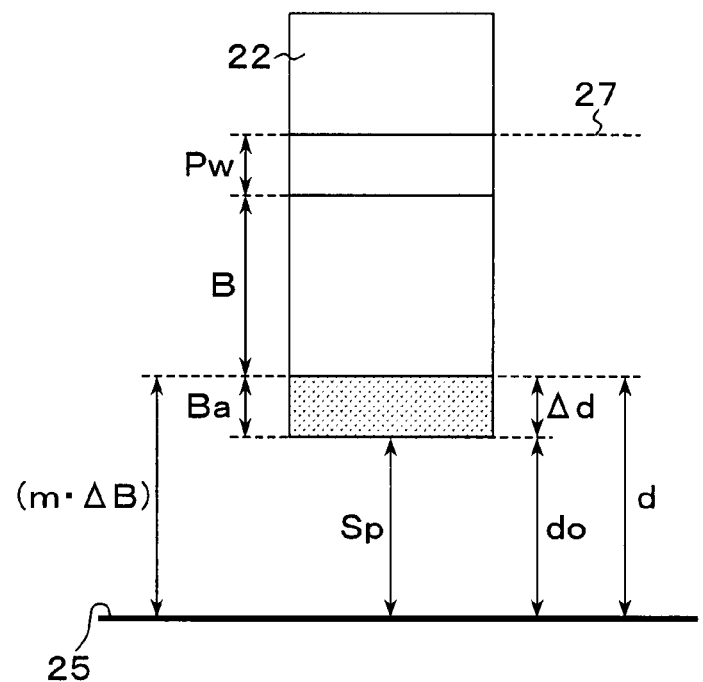
FIGS. 16A and 16B are explanatory diagram of a correction process of a base heater control value based on write clearance measured in the present embodiment.
Figure 16B:
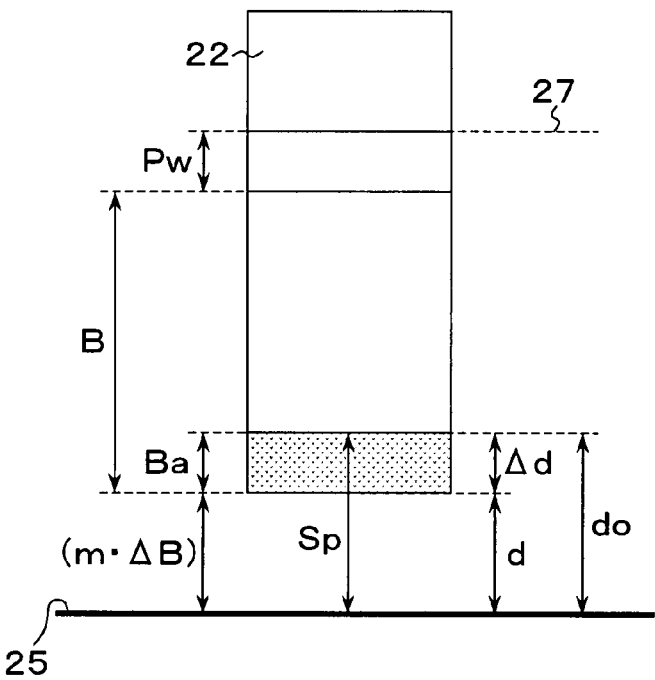

FIGS. 16A and 16B are explanatory diagrams of the correction process of the base heater control value B of the parameter table 50 of FIG. 4 based on the write clearance d obtained in the write clearance measurement process of FIGS. 15A and 15B and showing details of the parameter correction process of step S3 of FIG. 14.

FIG. 16A shows a correction process of the case in which the measured write clearance d is larger than the minimum clearance do corresponding to the minimum clearance heater control value Sp. Herein, heater control values are shown in the right side of the head 22, and the corresponding clearances [nm] are shown in the right side. In this case, since the minimum clearance do is smaller than the measured write clearance d, $$d = d - do$$

is obtained wherein the clearance correction value is Δd, and the heater correction value Ba for correction is calculated from the clearance difference value Δd, thereby correcting the base heater control value B. More specifically, when Δd=d−do is converted to the heater correction value Ba, it can be obtained as $$Ba = \Delta d / e.$$

When the heater correction value Ba obtained in this manner is corrected as $$B = B + a$$

in this case which is addition with the base heater control value B of default, then, it is stored in the parameter table 50. Herein, the heater correction value Ba is a value at the temperature in the apparatus upon correction. Therefore, after temperature correction at a standard temperature 30° C. is performed, it is added to the base heater control value B read from the parameter table 50, and then it is registered again in the parameter table 50.

FIG. 16B shows the case in which the measured write clearance d is smaller than the minimum clearance do. In this case, the clearance error Δd is calculated as $$\Delta d = do - d,$$

and when it is converted to the heater correction value Ba, it can be obtained as $$Ba = \Delta d / e.$$

In this case, since expansion has to be reduced by the amount corresponding to the calculated correction heater control value Ba, the base heater control value B which is corrected by subtracting the heater correction value Ba from the heater control value B so that $$B = B - Ba$$

is stored in the parameter table 50. As a matter of course, the heater correction value Ba is a value at the temperature in the apparatus. Therefore, after it is subjected to temperature correction at the standard temperature of 30° C., it is added to the base heater control value B read from the parameter table 50 and corrected, then it is registered again in the parameter table 50. The present invention also provides a program for a correction process, i.e., a firmware program for a correction process executed by the MPU 26 provided in the magnetic disk apparatus of FIG. 1, and the firmware program has the processing contents shown in the flow charts of FIG. 7, FIG. 8, FIG. 14, FIG. 15A, and FIG. 15B. The present invention also provides the control device of the magnetic disk apparatus of FIG. 1, and the control device corresponds to the control device 15 realized as the LSI device mounted on the control board of FIG. 1 in the present embodiment. Note that, in the above described embodiment, as shown in FIG. 5, the base heater control value register 94 and the adjustment heater control value register 96 are provided in the MPU 26 side, and, corresponding to that, the DA converters 98 and 100 are provided in the head IC 24 side respectively for the registers. However, it may be configured so that a single DA converter is provided in the head IC 24 side with respect to the two registers in the MPU side, and DA conversion is performed by inputting the values of the registers or an added value thereof to the DA converter so as to perform heater control. The above described embodiment employs, as an example, the case in which the heater control values (digital data) to be input to the DA converters for obtaining the heater electric power amounts are set in the parameter table 50 instead of the heater electric power amounts so as to perform the correction process. However, without treating it as the heater control values, the values of the heater electric power corresponding to the heater control values may be subjected to the correction process. In that case, the base heater control value B is treated as the heater electric power amount Pd caused by the output current converted by the DA converter 98, and the adjustment heater control value R is treated as heater electric power Pr caused by the output current converted by the DA converter 100. As a matter of course, the minimum clearance heater control value Sp in this case is also treated as minimum clearance heater electric power value Psp converted into the heater electric power amount. The above described embodiment employs, as an example, the case in which the firmware of the correction process is installed into the magnetic disk apparatus in a test process upon manufacturing so as to perform the correction process, and, after the correction process is finished, the apparatus is shipped to a user in the state in which the firmware of the correction process is deleted. However, the apparatus may be shipped to the user in the state in which the firmware of the correction process is remaining without deleting it so that the user can perform the correction process of the parameters of the present embodiment in accordance with needs during use. Moreover, the above described embodiment employs the case, as an example, in which the measurement process of the write clearance and correction of the base heater control values based on the measurement results thereof is performed for all the heads and all the zones. However, other than that, the write clearance measurement process may be performed merely for a particular measurement track, for example, a measurement track of an inner or outer system region of a magnetic disk for each head so as to correct the base heater control value B. Also, instead of all the zones, the write clearance may be measured in two zones, the outermost peripheral zone and the innermost peripheral zone, the write clearance therebetween may be obtained by complementation calculations, and the base heater control value B of the parameter table 50 may be corrected in the end. The present invention also includes arbitrary modifications that do not impair the object and advantages thereof and is not limited by the numerical values shown in the above described embodiment.

What is claimed is:

1. A control device of a storage apparatus having a head which is provided with a reading element and a recording element, is provided with a heater which varies a protrusion value by thermal expansion caused by electric power distribution and heating, and accesses data by flying over a rotating recording medium, the control device comprising
    a write clearance control unit which performs write heat upon recording by electric power distribution to the heater according to a predetermined base heater control value;
    a read clearance control unit which performs read heat upon reproduction by electric power distribution to the heater according to a control value which is obtained by adding the predetermined base heater control value to an adjustment heater control value;
    an amplitude measurement unit which repeats, upon desired correction, a process of attaining a write heat state by the write clearance control unit in the state in which the head is positioned to an arbitrary measurement track so as to perform recording in a data region of the measurement track, then switching the state to a read heat state by the read clearance control unit so as to reproduce a predetermined region of the measurement track, and detecting an amplitude of a read signal;
    a variance calculation unit which calculates a variance from a plurality of amplitude measurement values measured by the amplitude measurement unit;
    a contact determination unit which performs recording in a data region of the measurement track while sequentially increasing the base heater control value by the write clearance control unit when the variance is less than a threshold value, then performs reproduction of a predetermined region of the measurement track by switching the state to the read heat state by the read clearance control unit, repeats a measurement process by the amplitude measurement unit which detects the amplitude of the read signal, and determines that the head is in contact with the medium when the variance exceeds the threshold value; and
    a write clearance calculation unit which calculates a clearance of the head upon write heat from the increased amount of the base heater control value upon contact determination by the contact determination unit.

2. The control device according to claim 1, wherein the variance calculation unit calculates the variance as $$\sigma^2 = \frac{\sum_{i=1}^{n} \{Ai - Aav\}^2}{n} \qquad \text{Expression 4}$$

when the plurality of amplitude measurement values is Ai and a mean amplitude is Aav.

3. The control device according to claim 1, wherein the variance calculation unit calculates a standard deviation as a square root of the variance, and the contact determination unit determines that the head is in contact with the recording medium when the standard deviation exceeds a predetermined threshold value.

4. The control device according to claim 1, further having a parameter correction unit which corrects the base heater control value registered and administered in the parameter administration unit according to an error between the write clearance and a predetermined minimum clearance.

5. The control device according to claim 4, wherein the parameter correction unit
    performs correction by adding a heater correction value corresponding to a difference clearance, which is obtained by subtracting the minimum clearance from the measured write clearance, to the base heater control value when the measured write clearance is larger than the minimum clearance, and
    performs correction by subtracting the heater correction value corresponding to a difference clearance, which is obtained by subtracting the measured write clearance from the minimum clearance, from the base heater control value when the write clearance is smaller than the minimum clearance.

6. The control device according to claim 1, wherein the base heater control value serves as a base heater electric power value, and the adjustment heater control value serves as an adjustment heater electric power value.

7. A control method of a storage apparatus having a head which is provided with a reading element and a recording element, is provided with a heater which varies a protrusion value by thermal expansion caused by electric power distribution and heating, and accesses data by flying over a rotating storage medium, the control method comprising
    a write clearance control step of performing write heat upon recording by electric power distribution to the heater according to a predetermined base heater control value;
    a read clearance control step of performing read heat upon reproduction by electric power distribution to the heater according to a control value which is obtained by adding the predetermined base heater control value to an adjustment heater control value;
    an amplitude measurement step of repeating, upon desired correction, a process of attaining a write heat state in the write clearance control step in the state in which the head is positioned to an arbitrary measurement track so as to perform recording in a data region of the measurement track, then switching the state to a read heat state in the read clearance control step so as to reproduce a predetermined region of the measurement track, and detecting an amplitude of a read signal;

a variance calculation step of calculating a variance from a plurality of amplitude measurement values measured in the amplitude measurement step;

a contact determination step of performing recording in a data region of the measurement track while sequentially increasing the base heater control value in the write clearance control step when the variance is less than a threshold value, then performing reproduction of a predetermined region of the measurement track by switching the state to the read heat state in the read clearance control step, repeating a measurement process in the amplitude measurement step which detects the amplitude of the read signal, and determining that the head is in contact with the medium when the variance exceeds the threshold value; and a write clearance calculation step of calculating a clearance of the head upon write heat from the increased amount of the base heater control value upon contact determination by the contact determination unit.

8. The control method according to claim 7, wherein in the variance calculation step, the variance is calculated as $$\sigma^2 = \frac{\sum_{i=1}^{n} \{Ai - Aav\}^2}{n}$$ Expression 5 when the plurality of amplitude measurement values is Ai and a mean amplitude is Aav.

9. The control method according to claim 7, wherein, in the variance calculation step, a standard deviation is calculated as a square root of the variance; and, in the contact determination step, the head is determined to be in contact with the recording medium when the standard deviation exceeds a predetermined threshold value.

10. The control method of the storage apparatus according to claim 7, further including a parameter correction step of correcting the base heater control value registered and administered in the parameter administration step unit according to an error between the write clearance and a predetermined minimum clearance.

11. The control method according to claim 10, wherein, in the parameter correction step, correction is performed by adding a heater correction value corresponding to a difference clearance, which is obtained by subtracting the minimum clearance from the measured write clearance, to the base heater control value when the measured write clearance is larger than the minimum clearance, and correction is performed by subtracting the heater correction value corresponding to a difference clearance, which is obtained by subtracting the measured write clearance from the minimum clearance, from the base heater control value when the write clearance is smaller than the minimum clearance.

12. The control method of the storage apparatus according to claim 7, wherein the base heater control value serves as a base heater electric power value, and the adjustment heater control value serves as an adjustment heater electric power value.

13. A storage apparatus having a head which is provided with a reading element and a recording element, is provided with a heater which varies a protrusion value by thermal expansion caused by electric power distribution and heating, and accesses data by flying over a rotating storage medium, the storage apparatus comprising a write clearance control unit which performs write heat upon recording by electric power distribution to the heater according to a predetermined base heater control value;

a read clearance control unit which performs read heat upon reproduction by electric power distribution to the heater according to a control value which is obtained by adding the predetermined base heater control value to an adjustment heater control value;

an amplitude measurement unit which repeats, upon desired correction, a process of attaining a write heat state by the write clearance control unit in the state in which the head is positioned to an arbitrary measurement track so as to perform recording in a data region of the measurement track, then switching the state to a read heat state by the read clearance control unit so as to reproduce a predetermined region of the measurement track, and detecting an amplitude of a read signal;

a variance calculation unit which calculates a variance from a plurality of amplitude measurement values measured by the amplitude measurement unit;

a contact determination unit which performs recording in a data region of the measurement track while sequentially increasing the base heater control value by the write clearance control unit when the variance is less than a threshold value, then performs reproduction of a predetermined region of the measurement track by switching the state to the read heat state by the read clearance control unit, repeats a measurement process by the amplitude measurement unit which detects the amplitude of the read signal, and determines that the head is in contact with the medium when the variance exceeds the threshold value; and a write clearance calculation unit which calculates a clearance of the head upon write heat from the increased amount of the base heater control value upon contact determination by the contact determination unit.

14. The storage apparatus according to claim 13, wherein the variance calculation unit calculates the variance as $$\sigma^2 = \frac{\sum_{i=1}^{n} \{Ai - Aav\}^2}{n}$$ Expression 6 when the plurality of amplitude measurement values is Ai and a mean amplitude is Aav.

15. The storage apparatus according to claim 13, wherein the variance calculation unit calculates a standard deviation as a square root of the variance, and the contact determination unit determines that the head is in contact with the storage medium when the standard deviation exceeds a predetermined threshold value.

16. The storage apparatus of the storage apparatus according to claim 13, further having a parameter correction unit which corrects the base heater control value registered and administered in the parameter administration unit according to an error between the write clearance and a predetermined minimum clearance.

17. The storage apparatus according to claim 16, wherein the parameter correction unit performs correction by adding a heater correction value corresponding to a difference clearance, which is obtained by subtracting the minimum clearance from the measured write clearance, to the base heater control value when the measured write clearance is larger than the minimum clearance, and performs correction by subtracting the heater correction value corresponding to a difference clearance, which is obtained by subtracting the measured write clearance from the minimum clearance, from the base heater control value when the measured write clearance is smaller than the minimum clearance.

18. The storage apparatus according to claim 13, wherein the base heater control value serves as a base heater electric power value, and the adjustment heater control value serves as an adjustment heater electric power value.

* * * * *